(12) United States Patent
Ko et al.

(10) Patent No.: US 11,284,108 B2
(45) Date of Patent: Mar. 22, 2022

(54) VIDEO SIGNAL PROCESSING METHOD AND APPARATUS

(71) Applicants: WILUS INSTITUTE OF STANDARDS AND TECHNOLOGY INC., Gyeonggi-do (KR); HUMAX CO., LTD., Gyeonggi-do (KR)

(72) Inventors: Geonjung Ko, Seoul (KR); Dongcheol Kim, Gyeonggi-do (KR); Juhyung Son, Gyeonggi-do (KR); Jaehong Jung, Seoul (KR); Jinsam Kwak, Gyeonggi-do (KR)

(73) Assignees: WILUS INSTITUTE OF STANDARDS AND TECHNOLOGY INC., Gyeonggi-Do (KR); HUMAX CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/758,046

(22) PCT Filed: Oct. 24, 2018

(86) PCT No.: PCT/KR2018/012672
§ 371 (c)(1),
(2) Date: Apr. 22, 2020

(87) PCT Pub. No.: WO2019/083284
PCT Pub. Date: May 2, 2019

(65) Prior Publication Data
US 2021/0037259 A1    Feb. 4, 2021

(30) Foreign Application Priority Data

Oct. 24, 2017  (KR) .................... 10-2017-0138737
Oct. 26, 2017  (KR) .................... 10-2017-0140524
(Continued)

(51) Int. Cl.
H04N 19/11    (2014.01)
H04N 19/593   (2014.01)
(Continued)

(52) U.S. Cl.
CPC .......... H04N 19/593 (2014.11); H04N 19/11 (2014.11); H04N 19/136 (2014.11); H04N 19/176 (2014.11)

(58) Field of Classification Search
CPC combination set(s) only.
See application file for complete search history.

(56) References Cited

U.S. PATENT DOCUMENTS 10,602,138 B2 *  3/2020  Son ................. H04N 19/186
11,012,711 B2 *  5/2021  Xu .................. H04N 19/96
(Continued)

FOREIGN PATENT DOCUMENTS

JP  2013-120086   6/2013
JP  2020-526956   8/2020
(Continued)

OTHER PUBLICATIONS

International Search Report for PCT/KR2018/012672 dated Feb. 13, 2019.and its English translation from WIPO (now published as WO2019/083284).
(Continued)

*Primary Examiner* — Tsion B Owens
(74) *Attorney, Agent, or Firm* — Ladas & Parry, LLP

(57) ABSTRACT

Disclosed are a video signal processing method and apparatus for encoding or decoding a video signal. In more detail, the video signal processing method includes receiving intra prediction mode information for a current block, wherein the intra prediction mode information indicates one of a plurality of intra prediction modes configuring an intra prediction mode set; and decoding the current block based on the
(Continued)

received intra prediction mode information, wherein the intra prediction mode set comprises a plurality of angle modes, and the plurality of angle modes comprises a basic angle mode and an extended angle mode, wherein the extended angle mode is signaled based on the basic angle mode.

14 Claims, 20 Drawing Sheets

(30) Foreign Application Priority Data

Jan. 23, 2018 (KR) .................. 10-2018-0008498
Mar. 9, 2018 (KR) .................. 10-2018-0027814

(51) Int. Cl.
*H04N 19/136* (2014.01)
*H04N 19/176* (2014.01)

(56) References Cited

U.S. PATENT DOCUMENTS

| | | | |
|---|---|---|---|
| 2007/0025439 | A1 | 2/2007 | Han et al. |
| 2011/0292994 | A1 | 12/2011 | Lim et al. |
| 2012/0230403 | A1 | 9/2012 | Liu et al. |
| 2016/0373769 | A1 | 12/2016 | Zhao et al. |
| 2018/0255295 | A1* | 9/2018 | Lee .................. H04N 19/59 |
| 2019/0116381 | A1* | 4/2019 | Lee .................. H04N 19/107 |
| 2019/0356909 | A1* | 11/2019 | Lainema .............. H04N 19/176 |

FOREIGN PATENT DOCUMENTS

| | | |
|---|---|---|
| KR | 10-1632130 | 6/2016 |
| KR | 10-2017-0026276 | 3/2017 |
| WO | 2009/110753 | 9/2009 |
| WO | 2018/117894 | 6/2018 |
| WO | 2019/006105 | 1/2019 |

OTHER PUBLICATIONS

Written Opinion of the International Searching Authority for PCT/KR2018/012672 dated Feb. 13, 2019 and its English machine translation by Google Translate (now published as WO2019/083284).

Han, Yu et al., "Improvements for Intra Prediction Mode Coding", Joint Video Exploration Team (JVET) of ITU-T SG 16 WP 3 and ISO/IEC JTC 1/SC 29/WG 11, JVET-G0060, version 2, 7th Meeting: Torino, IT, Jul. 21, 2017, pp. 1-4.

Panusopone, Krit et al. "Weighted Angular Prediction", Joint Video Exploration Team (JVET) of ITU-T SG 16 WP 3 and ISO/IEC JTC 1/SC 29/WG 11, JVET-F0104, version 1. $6^{th}$ Meeting: Hpbart, AU, Apr. 7, 2017, pp. 1-4.

Office Action dated May 31, 2021 for Japanese Patent Application No. 2020-543439 and its English translation provided by Applicant's foreign counsel.

Rickard Sjoberg et al.: "Description of SDR and HDR video coding technology proposal by Ericsson and Nokia", Joint Video Exploration Team (JVET) of ITU-T SG 16 WP 3 and ISO/IEC JTC 1/SC 29/WG 11, JVET-J0012-v1, 10th Meeting: San Diego, CA, USA, Apr. 10-20, 2018, pp. i-iii, 5-9.

Fabien Racape et al., "CE3-related: Wide-angle intra prediction for non-square blocks", Joint Video Experts Team (JVET) of ITU-TSG 16 WP 3 and Iso/Iec Jtc 1/SC 29/WG 11, JVET-K0500rl, 11th Meeting: Ljubljana, SI, Jul. 10-18, 2018, pp. 1-7.

Office Action dated Oct. 11, 2021 for Japanese Patent Application No. 2020-543439 and its English translation provided by Applicant's foreign counsel.

* cited by examiner

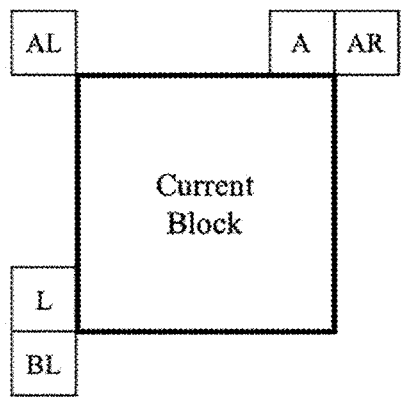
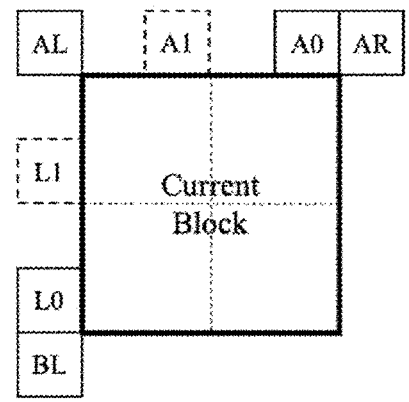
FIG. 8

Mode Set

| $S_0$ | $m_{0,0}$ | $m_{0,1}$ | $\cdots$ | $m_{0,K_0-2}$ | $m_{0,K_0-1}$ |
|---|---|---|---|---|---|
| $S_1$ | $m_{1,0}$ | $m_{1,1}$ | $\cdots$ | $m_{1,K_1-2}$ | $m_{1,K_1-1}$ |
| $\vdots$ | | | $\vdots$ | | |
| $S_{M-1}$ | $m_{M-1,0}$ | $m_{M-1,1}$ | $\cdots$ | $m_{M-1,K_{M-1}-2}$ | $m_{M-1,K_{M-1}-1}$ |

⟵ Exclusive Modes ⟶

*FIG. 20*

Mode Set

| $S_0$ | $cm_0$ | $cm_1$ | $\cdots$ | $cm_{L-1}$ | $m_{0,0}$ | $m_{0,1}$ | $\cdots$ | $m_{0,L_0-1}$ |
|---|---|---|---|---|---|---|---|---|
| $S_1$ | $cm_0$ | $cm_1$ | $\cdots$ | $cm_{L-1}$ | $m_{1,0}$ | $m_{1,1}$ | $\cdots$ | $m_{1,L_1-1}$ |
| $\vdots$ | | | | | $\vdots$ | | | |
| $S_{M-1}$ | $cm_0$ | $cm_1$ | $\cdots$ | $cm_{L-1}$ | $m_{M-1,0}$ | $m_{M-1,1}$ | $\cdots$ | $m_{M-1,L_{M-1}-1}$ |

⟵ Sharing Modes ⟶ ⟵ Exclusive Modes ⟶

*FIG. 21*

| Total intra modes (35) | MPM flag | Sel. flag | Bin string |
|---|---|---|---|
| MPM modes (4) | 1 | | 0 |
| | | | 10 |
| | | | 110 |
| | | | 111 |
| Selected modes (8) | 0 | 1 | 3 bits fixed |
| Non-selected modes (23) | 0 | 0 | Truncated binary |

(a)

| Truncated binary | | | | | |
|---|---|---|---|---|---|
| Value | | 4 bins | | | |
| 0 | 0 | 0 | 0 | 0 | 0 |
| 1 | 0 | 0 | 0 | 0 | 1 |
| 2 | 0 | 0 | 0 | 1 | 0 |
| ... | | | | | |
| 8 | 0 | 1 | 0 | 0 | 0 |
| 9 | 1 | 0 | 0 | 1 | 0 |
| ... | | | | | |
| 20 | 1 | 1 | 1 | 0 | 1 |
| 21 | 1 | 1 | 1 | 1 | 0 |
| 22 | 1 | 1 | 1 | 1 | 1 |
| | | 5 bins | | | |

| Total modes (67) | MPM flag | Sel. flag | Value | Bin string (1~6) | | | | | | total bits |
|---|---|---|---|---|---|---|---|---|---|---|
| MPM (2) | 1 | - | 0 | 0 | | | | | | 2 |
|  |  |  | 1 | 1 | | | | | | 2 |
| Selected (16) | 0 | 1 | (0~15) | 4 bits fixed | | | | | | 6 |
| Non-sel. (49=15+34) | 0 | 0 | (0~48) | 5 bins | | | | | |  |
|  |  |  | 0 | 0 | 0 | 0 | 0 | 0 | | 7 (15) |
|  |  |  | 1 | 0 | 0 | 0 | 0 | 1 | |  |
|  |  |  | 2 | 0 | 0 | 0 | 1 | 0 | |  |
|  |  |  | ... | | | | | | |  |
|  |  |  | 14 | 0 | 0 | 1 | 1 | 1 | 0 |  |
|  |  |  | 15 | 0 | 1 | 1 | 1 | 1 | 0 |  |
|  |  |  | ... | | | | | | |  |
|  |  |  | 46 | 1 | 1 | 1 | 1 | 0 | 1 | 8 (34) |
|  |  |  | 47 | 1 | 1 | 1 | 1 | 1 | 0 |  |
|  |  |  | 48 | 1 | 1 | 1 | 1 | 1 | 1 |  |
|  |  |  |  | 6 bins | | | | | |  |

(a) |MPM|=2, Selected (16)

| Total modes (67) | MPM flag | Sel. flag | Value | Bin string (1~6) | | | | | | total bits |
|---|---|---|---|---|---|---|---|---|---|---|
| MPM (2) | 1 | - | 0 | 0 | | | | | | 2 |
|  |  |  | 1 | 1 | | | | | | 2 |
| Selected (9) | 0 | 1 | (0~8) | 3 bits fixed | | | | | | 5 |
| Non-sel. (56=8+48) | 0 | 0 | (0~48) | 5 bins | | | | | |  |
|  |  |  | 0 | 0 | 0 | 0 | 0 | 0 | | 7 (8) |
|  |  |  | 1 | 0 | 0 | 0 | 0 | 1 | |  |
|  |  |  | 2 | 0 | 0 | 0 | 1 | 0 | |  |
|  |  |  | ... | | | | | | |  |
|  |  |  | 7 | 0 | 0 | 0 | 1 | 1 | 1 |  |
|  |  |  | 8 | 0 | 1 | 0 | 0 | 0 | 0 |  |
|  |  |  | ... | | | | | | |  |
|  |  |  | 53 | 1 | 1 | 1 | 1 | 0 | 1 | 8 (48) |
|  |  |  | 54 | 1 | 1 | 1 | 1 | 1 | 0 |  |
|  |  |  | 55 | 1 | 1 | 1 | 1 | 1 | 1 |  |
|  |  |  |  | 6 bins | | | | | |  |

(b) |MPM|=2, Selected (9)

FIG. 25

VIDEO SIGNAL PROCESSING METHOD AND APPARATUS

CROSS-REFERENCE TO RELATED APPLICATIONS

This application is the U.S. national phase of PCT Application No. PCT/KR2018/012672 filed on Oct. 24, 2018, which claims priority to Korean Patent Application No. 10-2017-0138737, filed on Oct. 24, 2017, Korean Patent Application No. 10-2017-0140524, filed on Oct. 26, 2017, Korean Patent Application No. 10-2018-0008498, filed on Jan. 23, 2018, and Korean Patent Application No. 10-2018-0027814, filed on Mar. 9, 2018, the entire contents of which are incorporated herein by reference.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE

Technical Problem

The present invention has an object to increase the coding efficiency of a video signal.

In addition, the present invention has an object to increase signaling efficiency when predicting a current block using prediction information of neighbor blocks.

Technical Solution

In order to solve the above problems, the present invention provides the following video signal processing apparatus and video signal processing method.

First, according to an embodiment of the present invention, a method for processing a video signal includes receiving intra prediction mode information for a current block, wherein the intra prediction mode information indicates one of a plurality of intra prediction modes included in an intra prediction mode set, and decoding the current block based on the received intra prediction mode information, wherein the intra prediction mode set includes a plurality of angle modes, and the plurality of angle modes includes a basic angle mode and an extended angle mode, wherein the extended angle mode is signaled based on the basic angle mode.

In addition, according to an embodiment of the present invention, a video signal processing apparatus including a processor, wherein the processor is configured to receive intra prediction mode information for a current block, wherein the intra prediction mode information indicates one of a plurality of intra prediction modes included in an intra prediction mode set, and decodes the current block based on the received intra prediction mode information, wherein the intra prediction mode set includes a plurality of angle modes, and the plurality of angle modes includes a basic angle mode and an extended angle mode, wherein the extended angle mode is signaled based on the basic angle mode.

The basic angle mode is a mode corresponding to an angle within a preset first angle range, and the extended angle mode is determined based on the basic angle mode.

The extended angle mode is a wide angle mode outside the first angle range.

The wide angle mode replaces at least one basic angle mode within the first angle range, and an intra prediction mode index corresponding to the replaced basic angle mode signals the wide angle mode.

The extended angle mode is an angle mode between basic angle modes within the first angle range.

An interval between the extended angle modes of the intra prediction mode set is set based on an interval between corresponding basic angle modes.

An angle interval between the extended angle modes is set to be the same as an angle interval between the corresponding basic angle modes.

Whether to use the extended angle mode is determined based on at least one of a shape and size of the current block.

The number of extended angle modes in the intra prediction mode set is set below the number of basic angle modes.

Advantageous Effects

According to an embodiment of the present invention, coding efficiency of a video signal may be increased.

Further, according to an embodiment of the present invention, a prediction method for a current block can be variously extended, and signaling overhead due to such expansion can be minimized.

DESCRIPTION OF DRAWINGS

FIG. 8 shows a detailed embodiment of a method of signaling an intra prediction mode.

FIGS. 20 and 21 show an embodiment of classifying intra prediction modes into a plurality of subsets.

FIG. 23 shows a detailed embodiment of signaling the intra prediction mode of the current block using a subset of the classified intra prediction modes.

FIG. 25 shows an embodiment of variably adjusting the number of MPM modes and signaling the intra prediction mode of the current block based on this.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
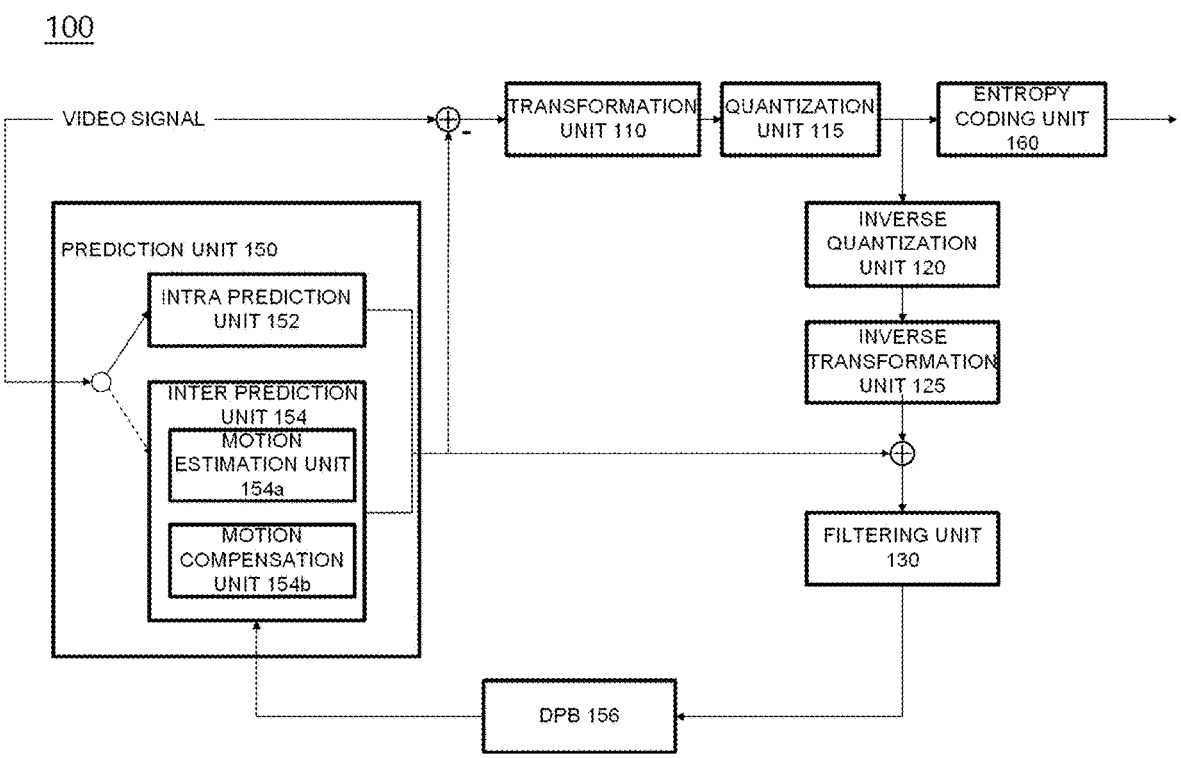
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a discrete cosine transform (DCT), a discrete sine transform (DST), or a wavelet transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information (reference picture index, motion vector information, etc.) on the reference region to the entropy coding unit 160. The motion compensation unit 154b performs motion compensation using the motion vector value transmitted from the motion estimation unit 154a.

The inter prediction unit 154 transmits inter encoding information including motion information on a reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
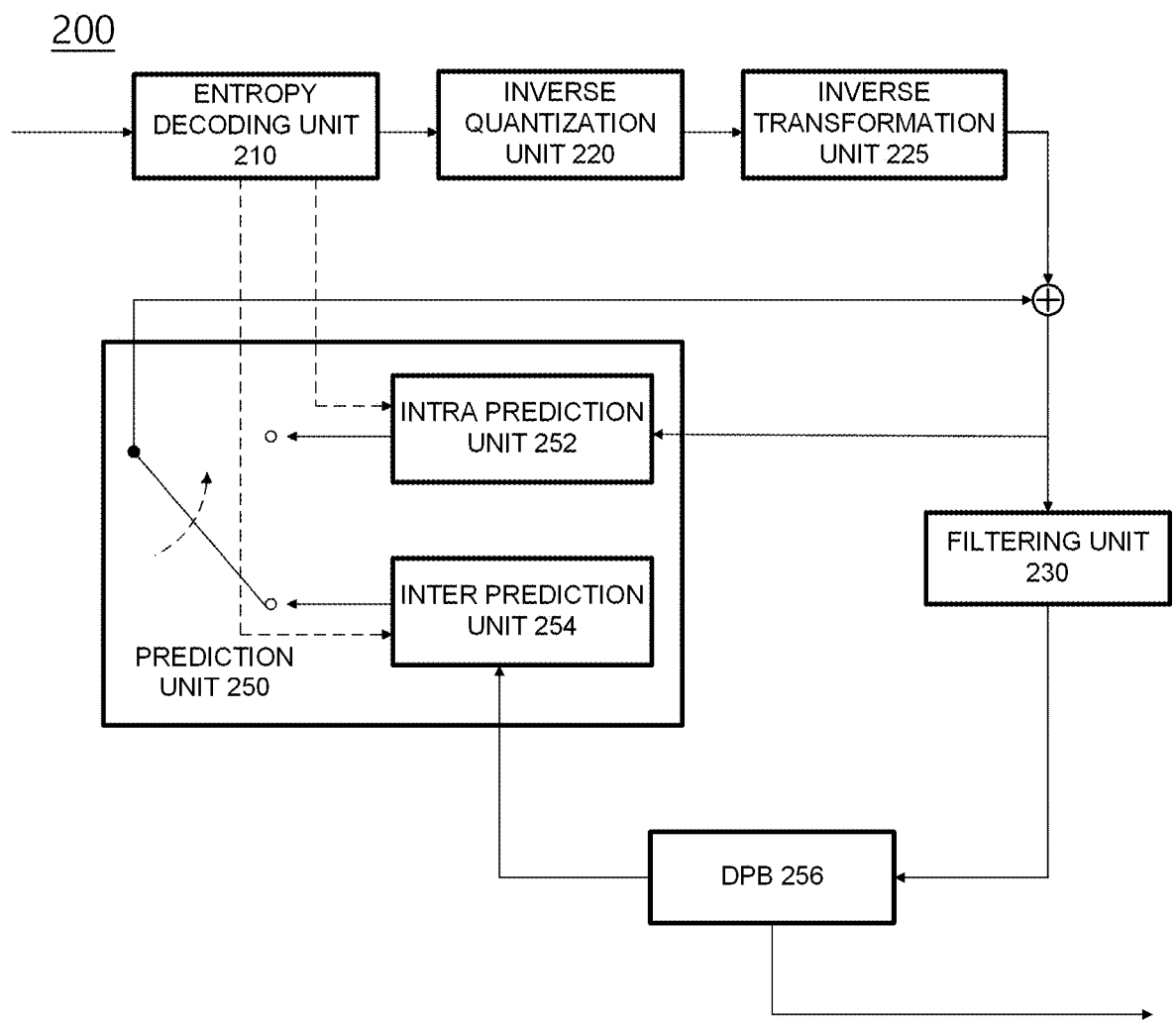
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the prediction value obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction, is called an intra picture or an I picture (or, tile/slice), and a picture (or, tile/slice) that can perform both intra prediction and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or, tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts pixel values of the current block using reconstructed pixels located on the left and/or upper side of the current block as reference pixels. According to an embodiment, the reference pixels may be pixels neighboring to the left boundary of the current block and/or pixels neighboring to the upper boundary. According to another embodiment, the reference pixels may be neighboring pixels within a predetermined distance from the left boundary of the current block among pixels of a neighbor block of the current block and/or neighboring pixels within a predetermined distance from the upper boundary of the current block. In this case, the neighbor block of the current block may include at least one of the left (L) block, the above (A) block, the below left (BL) block, the above right (AR) block, or the above left (AL) block, which is neighboring to the current block.

The inter prediction unit 254 generates a prediction block using reference pictures and inter encoding information stored in the DPB 256. The inter coding information may include motion information (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a pixel value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously using motion information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
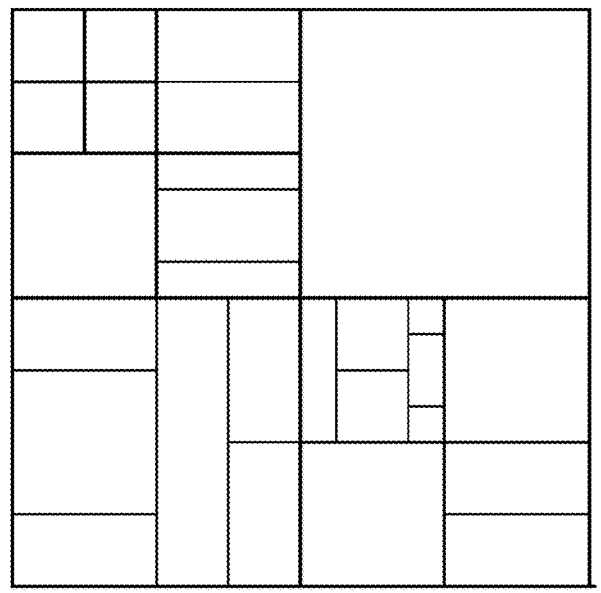
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split can be performed recursively.

The leaf node of the multi-type tree can be a coding unit. If the coding unit is not too large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
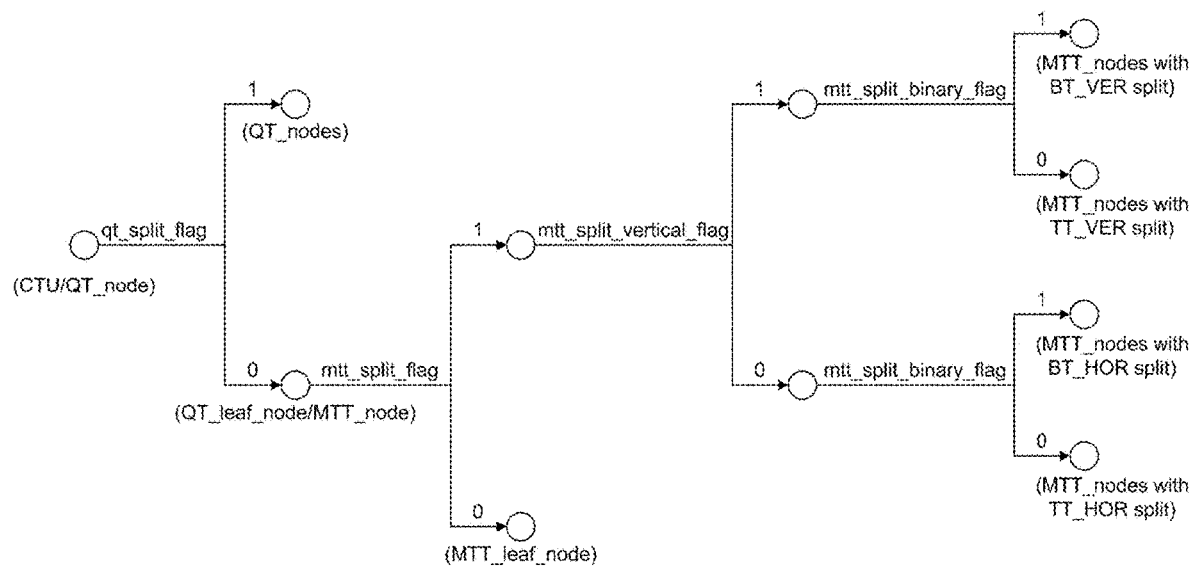
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
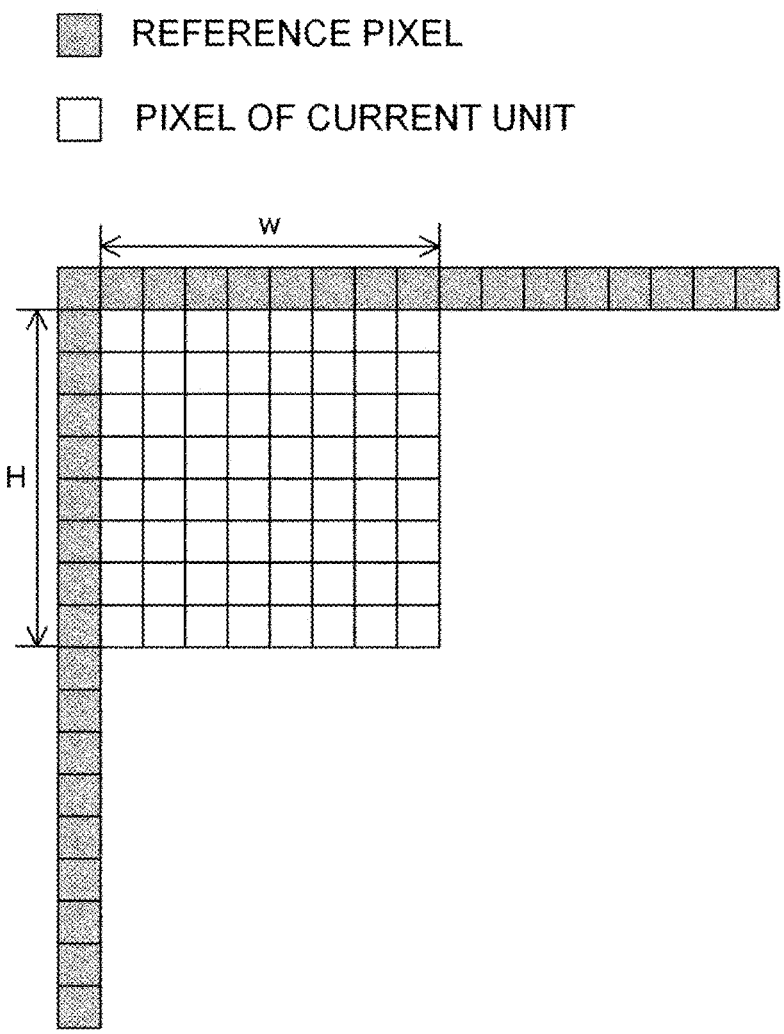
FIG. 5 shows an embodiment of reference samples used for prediction of a current block in an intra prediction mode.
Figure 6:
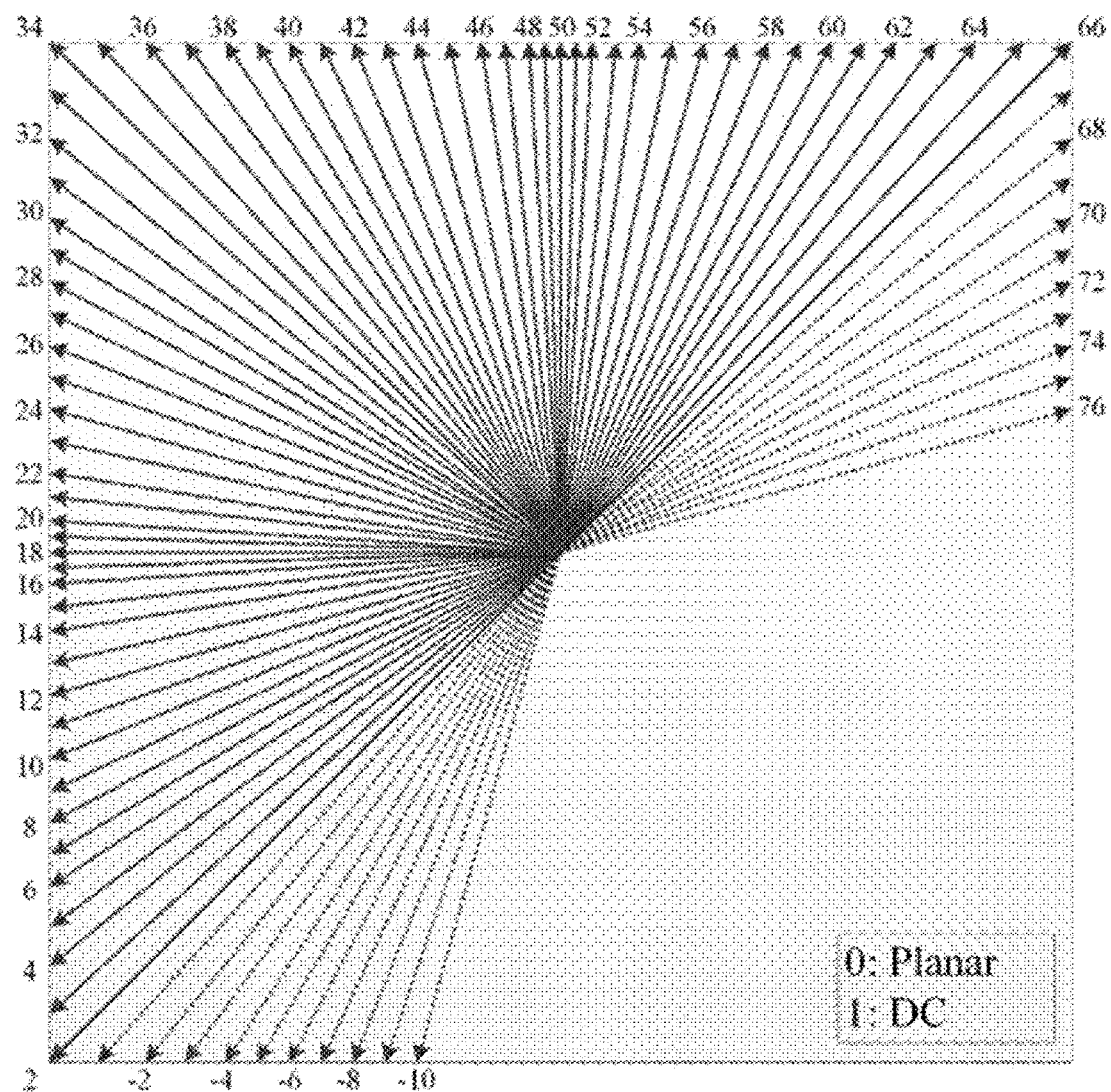
FIG. 6 shows an embodiment of prediction modes used for intra prediction.

FIGS. 5 and 6 more specifically illustrate an intra prediction method according to an embodiment of the present invention. As described above, the intra prediction unit predicts pixel values of the current block using reconstructed pixels located on the left and/or upper side of the current block as reference pixels.

First, FIG. 5 shows an embodiment of reference samples used for prediction of a current block in an intra prediction mode. According to an embodiment, the reference pixels may be pixels neighboring to the left boundary of the current block and/or pixels neighboring to the upper boundary. As shown in FIG. 5, when the size of the current block is W×H and pixels of a single reference line neighboring to the current block are used for intra prediction, reference pixels may be configured using a maximum of 2 W+2H+1 neighboring pixels located on the left and/or upper side of the current block. Meanwhile, according to an additional embodiment of the present invention, pixels of multi-reference lines may be used for intra prediction of the current block. The multiple reference line may consist of n lines located within a preset range from the current block. According to an embodiment, when pixels of multiple reference lines are used for intra prediction, separate index information indicating lines to be configured as reference pixels may be signaled. If at least some neighboring pixels to be used as reference pixels are not reconstructed, the intra prediction unit may obtain reference pixels by performing a reference sample padding process according to a preset rule. In addition, the intra prediction unit may perform a reference sample filtering process to reduce errors in intra prediction. That is, reference pixels may be obtained by performing filtering on neighboring pixels and/or pixels obtained by a reference sample padding process. The intra prediction unit predicts pixels of the current block using the reference pixels obtained in such a manner.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45−offset2) degrees and (−135-offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes {2, 4, 6, . . . , 66} and the extended angle mode is an angle mode corresponding to any one of intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes {2, 3, 4, . . . , 66} and the extended angle mode is an angle mode corresponding to any one of intra prediction modes among {−10, −9, . . . , −1} and {67, 68, . . . , 76}. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes 12, 4, 6, . . . , 661. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode can be used for intra prediction of the current block. According to another embodiment, when the current block is a block other than a square, the extended angle mode may be used for intra prediction of the current block, and when the current block is a square block, only the basic angle mode can be used for intra prediction of the current block.

The intra prediction unit determines reference pixels and/or interpolated reference pixels to be used for intra prediction of the current block based on the intra prediction mode information of the current block. When the intra prediction mode index indicates a specific angle mode, a reference pixel or an interpolated reference pixel corresponding to the specific angle from the current pixel of the current block is used for prediction of the current pixel. Accordingly, different sets of reference pixels and/or interpolated reference pixels may be used for intra prediction according to the intra prediction mode. After intra prediction of a current block is performed using reference pixels and intra prediction mode information, the decoder reconstructs the pixel values of the current block by adding the residual signal of the current block obtained from the inverse transformation unit to the intra prediction value of the current block.

Figure 7:
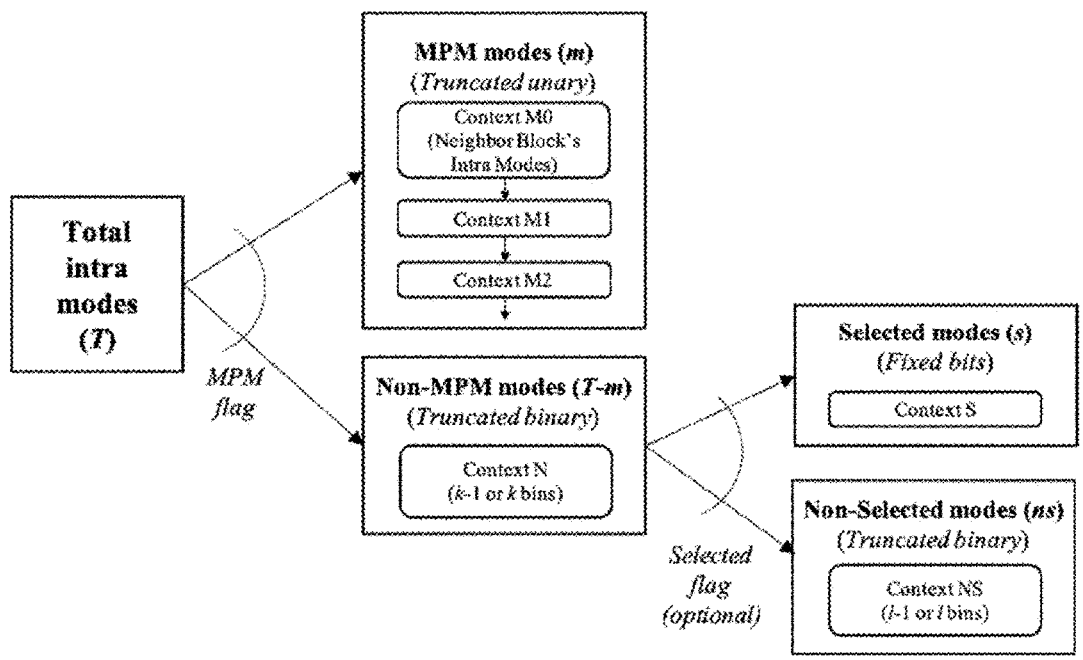
FIG. 7 shows an embodiment of a method of signaling an intra prediction mode selected by an encoder to a decoder.

FIG. 7 shows an embodiment of a method of signaling an intra prediction mode selected by an encoder to a decoder. When the total number of intra prediction modes included in the intra prediction mode set is T (e.g., 67), the method of signaling T modes by simply expressing them in binary is inefficient because the probability of each mode to be selected and the context of the corresponding block and neighbor blocks are not considered. Therefore, efficient signaling may be performed by separately managing the list of some modes that are most likely to be used in the current block among all modes.

According to an embodiment of the present invention, for intra prediction of a current block, a list of at least one prediction mode composed of some of the entire intra prediction modes may be managed. The first prediction mode list for intra prediction is a Most Probable Modes (MPM) list. The intra prediction mode included in the MPM list is the MPM mode, and the intra prediction mode not included in the MPM list may be referred to as a non-MPM mode. The encoder signals the MPM flag to distinguish whether the intra prediction mode used in the current block is an MPM mode or a non-MPM mode. The decoder may determine whether the intra prediction mode used in the current block is the MPM mode or the non-MPM mode through the received MPM flag.

According to an embodiment, efficient signaling can be performed with fewer bits by using a separate encoding method for the MPM mode. When m is the number of MPM modes included in the MPM list, the number of non-MPM modes is T−m. If the number m of MPM modes is less than the number T−m of non-MPM modes, the MPM mode may be coded with truncated unary binarization and the non-MPM mode may be coded with truncated binary binarization.

The MPM list may be configured by considering various contexts by each step as follows. First, the MPM list may include intra prediction modes and plane/DC modes used in neighbor blocks of the current block (context M0). If an intra prediction mode-encoded block exists among reconstructed neighbor blocks, due to the regional similarity of pictures, it is possible that the current block uses the same intra prediction mode as that of the corresponding block. Accordingly, the MPM list may be configured including an intra prediction mode of neighbor blocks. According to an embodiment, the neighbor block of the current block may include at least one of the left (L) block, the above (A) block, the below left (BL) block, the above right (AR) block, or the above left (AL) block. For example, a neighbor block of the current block may include a left (L) block and an above (A) block neighboring to the current block. The left (L) block is the lowermost block neighboring to the left border of the current block, and the above (A) block is the rightmost block neighboring to the upper boundary of the current block. A detailed embodiment of neighbor blocks for configuring the MPM list will be described again with reference to FIG. 8. The intra prediction mode, planar mode, and DC mode selected from the neighbor blocks of the current block may be added to the MPM list according to a preset order. For example, the MPM list may be configured in the order of {block L mode, block A mode, planar mode, DC mode, block BL mode, block AR mode, block AL mode}.

Second, when the number m of MPM modes is not filled by the above method, the MPM list may be filled by applying additional context conditions (e.g., context M1, context M2, . . . ). When applying additional context conditions, the intra prediction mode already included in the MPM list is not newly added.

Meanwhile, the remaining T-m non-MPM modes not included in the MPM list among the total T intra prediction modes may be coded by truncated binary binarization. When the truncated binary binarization is used, if it is assumed that $2^{\wedge}(k-1) < T-m < 2^{\wedge}(k)$, the initial $2^{\wedge}(k)-(T-m)$ indices may be signaled using k-1 bits (or bins), and the remaining indices may be signaled using k bits (or bins). Therefore, additional context conditions (i.e., context N) are also applied to non-MPM modes to signal modes, which are more likely to be selected in the corresponding block, with an index composed of k-1 bits, so that signaling overhead can be minimized.

According to a further embodiment of the present invention, a second prediction mode list composed of some of the non-MPM modes may be managed. More specifically, the non-MPM modes may be additionally divided into a selected (s) mode and a non-selected (ns) mode, and a second prediction mode list composed of selected modes (i.e., a selected mode list) may be managed. The intra prediction mode included in the selected mode list may be referred to as a selected mode, and the intra prediction mode not included in the selected mode list may be referred to as a non-selected mode. The encoder signals a selected mode flag to distinguish whether the intra prediction mode used in the current block is the selected mode or the non-selected mode. The decoder may identify whether the intra prediction mode used in the current block is the selected mode or the non-selected mode through a received selected mode flag.

When the non-MPM mode is additionally classified as described above, the selected mode may be coded with a fixed length. In this case, by applying an additional context condition (e.g., context S) to the selected modes, modes that are likely to be selected in the corresponding block may be preferentially arranged. In this case, s (in this case, s is a power of 2) selected modes may be coded with a fixed length, and the remaining ns non-selected modes may be coded with truncated binary binarization. The ns non-selected modes may be signaled using any 1-1 bits (or bins) or 1 bits (or bins). In this case, by applying an additional context condition (i.e., context NS) to the non-selected modes, signals that are relatively likely to be selected in the corresponding block are signaled with an index consisting of 1-1 bits, so that signaling overhead can be minimized.

A detailed embodiment of the context conditions will be described later with reference to the drawings. The context conditions that are further defined in the following embodiments may be individually or repeatedly applied to various configurations to which the context conditions {M0, M1, M2, N, S, NS} are applied. For example, a context condition for signaling the basic angle mode over the extended angle mode may be additionally used. In addition, the context conditions of first adding angle modes to the prediction mode list by adding an arbitrary offset (e.g., -1, +1) to the angle mode of neighbor blocks derived through the first context condition (e.g., context M0) of the MPM mode an be used. This context condition may be applied as a context condition for one or more of MPM mode, non-MPM mode, selected mode, or non-selected mode.

According to a further embodiment of the present invention, the above-described intra prediction method may be determined based on the number of intra prediction modes of neighbor blocks and/or intra prediction mode information. For example, whether to distinguish the MPM mode, the non-MPM mode, the selected mode and the non-selected mode, the number (i.e., m, T-m, s, and ns) of intra prediction modes signaled for each mode, and a method of encoding each mode (i.e., truncated unary binarization, truncated binary binarization, fixed length encoding) may be variably configured according to the number of intra prediction modes of neighbor blocks or their values. In this case, the neighbor blocks may be preset blocks referenced to configure the MPM list.

First, after examining the intra prediction modes of the neighbor blocks of the current block to configure the MPM list, the variable configuration may be applied based on the total number of prediction modes. When the current block is a block of B frames or P frames, the method of configuring the MPM list may be changed according to the number of blocks in which intra prediction is performed among neighbor blocks and/or prediction modes. If this is further expanded, different methods may be used between the I frame and the B/P frame to configure the MPM list. In the I frame, since all the neighbor blocks are configured with intra prediction, the following second method or similar method may be applied without applying the first method described above.

Second, the variable configuration may be applied based on the number of different intra prediction modes used in neighbor blocks. For example, the method of configuring the MPM list may be changed according to whether all of the intra prediction modes used in neighbor blocks are the same or different. Alternatively, a method of configuring the MPM list may be changed according to different degrees of intra prediction modes used in neighbor blocks. The different degree of intra prediction modes used in neighbor blocks may be determined based on whether the number of intra prediction modes used in neighbor blocks is greater than or equal to a preset value. Also, a different degree of intra prediction modes used in neighbor blocks may be determined based on a difference in mode values of intra prediction modes used in neighbor blocks. When different degrees of intra prediction modes used in neighbor blocks satisfy a preset criterion, an MPM list may be configured based on the first method. However, when different degrees of intra prediction modes used in neighbor blocks do not satisfy a preset criterion, an MPM list may be configured based on a second method different from the first method. Meanwhile, the neighbor blocks of the current block under review to generate the variable MPM list may include blocks of additional positions in addition to the default position. A specific embodiment of this will be described with reference to FIG. 8.

FIG. 8 shows a detailed embodiment of a method of signaling an intra prediction mode. FIGS. 8(*a*) and 8(*b*) show embodiments of neighbor blocks referenced to configure a prediction mode list. FIG. 8(*c*) shows an embodiment of a method for signaling the intra prediction mode described above. In addition, FIG. 8(*d*) shows an embodiment of signaling non-selected modes with truncated binary binarization.

First, FIG. 8(*a*) shows an embodiment of relative positions of neighbor blocks referenced to configure an MPM list. Referring to FIG. 8(*a*), neighbor blocks are referenced in the order of the left (L) block, the above (A) block, the below left (BL) block, the above right (AR) block, or the above left (AL) block neighboring to the current block. In this case, the intra prediction mode, planar mode, and DC mode selected from the neighbor blocks may be added to the MPM list according to a preset order. However, in the embodiment of the present invention, neighbor blocks referenced to configure the MPM list are not limited thereto. For example, a neighbor block of the current block may include a left (L) block and an above (A) block neighboring to the current block. The left (L) block is the lowermost block neighboring to the left border of the current block, and the above (A) block is the rightmost block neighboring to the upper boundary of the current block.

Next, FIG. 8(*b*) shows another embodiment of the relative positions of neighbor blocks referenced to configure the MPM list. The neighbor blocks of the current block may be split into smaller sizes than the current block, and a plurality of neighbor blocks may exist at the left or upper boundary of the current block. In this case, intra prediction modes of a plurality of blocks neighboring to the left or upper boundary of the current block may be referenced to configure the MPM list. In the embodiment of FIG. 8(*b*), a plurality of blocks neighboring to the left boundary of the current block are referred to as L0 and L1 from the bottom to the top, and a plurality of blocks neighboring to the upper boundary of the current block are referred to as A0 and A1 from the right to the left.

According to the first embodiment, the MPM list may be configured in the order of {mode of block L0, mode of block A0, planar mode, DC mode, mode of block BL, mode of block AR, and mode of block AL}. According to the second embodiment, the MPM list may be configured in the order of {mode of block L0, mode of block L1, mode of block A0, mode of block A1, planar mode, DC mode, mode of block BL, mode of block AR, and mode of block AL}. In this case, the position and number of additionally referenced neighbor blocks may be variable. Also, additional blocks may be referred to in the below left BL, above right AR, and above left AL neighboring to the current block. According to the third embodiment, the MPM list may be configured in the order of (mode of block L0, mode of block A0, planar mode, DC mode, mode of block L1, mode of block A1, mode of block BL, mode of block AR, and mode of block AL}. That is, signaling overhead can be reduced by prioritizing the order in which the planar mode and the DC mode having a high probability of selection are selected as the MPM list over the mode of the block L1 and the mode of the block A1. According to the fourth embodiment, the MPM list may be configured in the order of {mode of block L0, mode of block A0, planar mode, DC mode, mode of block BL, mode of block AR, mode of block AL, mode of block L1, and mode of block A1}. That is, after the MPM list configuration order according to the first embodiment described above, the blocks L1 and A1 may be referred to.

According to a further embodiment of the present invention, the order of configuring the MPM list may be determined based on the shape of the current block. More specifically, when the current block is a non-square block, the reference order of neighbor blocks may be differently determined according to whether the current block is a vertical block or a horizontal block. For example, when the current block is a vertical block, the left block may be preferentially referred to than the upper block, and when the current block is a horizontal block, the upper block may be preferentially referred to than the left block. According to another embodiment, the order of configuring the MPM list may be determined by comparing the shape of the current block with the shape of the neighbor block. For example, when the current block is a vertical block, an intra prediction mode used for the vertical block among preset neighbor blocks may be preferentially included in the MPM list.

According to another embodiment of the present invention, the order of configuring the MPM list may be determined in consideration of the association between the shape of the current block and the angle mode used in the neighbor blocks. For example, if the current block is a vertical block, angle modes that are in a preset range from vertical (VER) mode 50 or between diagonal (DIA) mode 34 and vertical diagonal (VDIA) mode 66 among the angle modes used in preset neighbor blocks may be preferentially included in the MPM list. According to a further embodiment, intra prediction modes included in the MPM list of neighbor blocks may be included in the MPM list of the current block. In this case, when the MPM list of the current block is not filled with intra prediction modes used for neighbor blocks, intra prediction modes included in the MPM list of the neighbor blocks may be added to the MPM list of the current block.

FIG. 8(*c*) shows an embodiment of a method for signaling the intra prediction mode described above. Among the T intra prediction modes, m modes are divided into MPM modes and signaled with truncated unary binarization. According to an embodiment, T may be 67 and m may be 6. In truncated unary binarization, as the number of bits (or bins) used increases as the signaling index increases, signaling efficiency may be increased by matching modes that are more likely to be selected in a corresponding block to a low value index. For this, the encoder and decoder configure the MPM list with the same context condition, and the derived mode values may be rearranged based on the context condition and signaled. For example, CABAC-based encoding may be performed by classifying the selected modes in the order of non-angle mode, vertical mode, and plane angle mode such as DC/planar mode. Next, s selected modes determined by any context condition are signaled with fixed length bits, and the remaining ns non-selected modes are signaled with truncated binary binarization. According to an embodiment, n may be 16 and ns may be 45.

FIG. 8(*d*) shows an embodiment of signaling non-selected modes with truncated binary binarization. According to the above embodiment, the number ns of non-selected modes is 45. When truncated binary binarization is used, since $2^5<45<2^6$, the initial $2^6-45=19$ indices may be signaled using 5 bits (or bins), and the remaining 26 indices are signaled using 6 bits (or bins). Therefore, as a preset context condition is also applied to non-selected modes, modes that are more likely to be selected in a corresponding block may be matched to a low value index signaled by 5 bits (or bins). Specific embodiments of the preset context condition will be described with reference to the following drawings.

Figure 9:
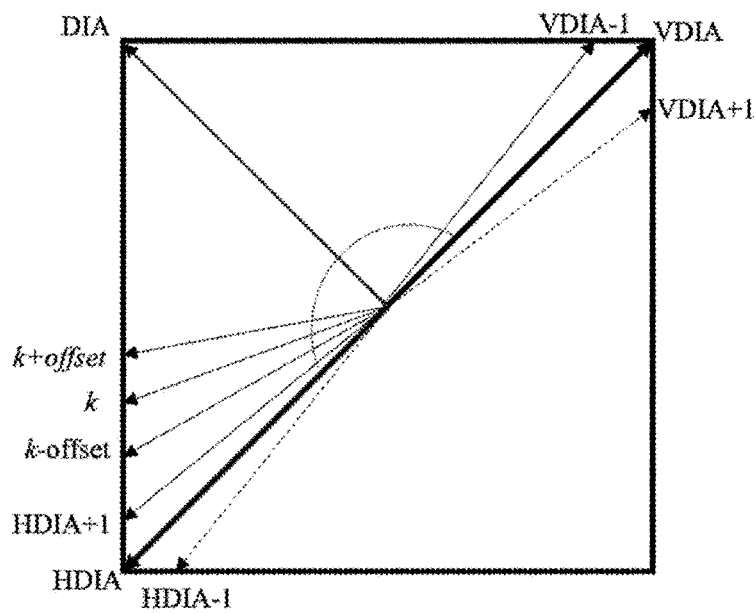
FIG. 9 shows an embodiment of a context condition applied to the intra prediction mode.

FIG. 9 illustrates a method of applying a preset offset to an angle mode as an embodiment of context conditions applied to an intra prediction mode. According to an embodiment of the present invention, a new priority may be assigned to an angle mode obtained by adding or subtracting a preset offset to or from an angle mode having a specific priority. For example, a first priority or a second priority may be assigned to angle modes that add or subtract a preset offset with respect to an angle mode having a first priority. According to an embodiment, modes having a first priority among all intra prediction modes are preferentially selected over the remaining modes. Further, the remaining modes are divided into modes having a second priority and modes having a third priority, and modes having a second priority are selected preferentially over modes having a third priority. Here, the preferentially selected mode may be matched to a low value index signaled with fewer bits.

More specifically, when the intra prediction mode indexes a, b and c have a first priority, the first priority or the second priority may be assigned to the modes of intra prediction mode indexes a−offset, a+offset, b−offset, b+offset, c−offset, and c+offset (where offset is an integer other than 0). For example, in the MPM list configuration process, the first priority is assigned to modes selected from neighbor blocks, and the first priority or the second priority may be assigned to angle modes in which −1 or +1 is added to angle modes among modes selected from the neighbor blocks. As the same or the next priority is assigned to the modes in which a preset offset is added to or subtracted from the modes of the highest priority, the highest priority may be assigned to modes having similarity to the highest priority.

However, referring to FIG. 9, when angle modes are limited within a preset angle range, the angle mode obtained by adding or subtracting an offset to or from a specific angle mode may be out of a preset angle range. For example, when the angle mode of the intra prediction mode set is limited to intra prediction modes 2 to 66 and the preset offset is 1, the intra prediction mode 1 in which the offset is subtracted from the intra prediction mode 2 or the intra prediction mode 67 in which the offset is added to the intra prediction mode 66 is out of a preset angle range. That is, the intra prediction mode k-offset or k+offset derived from the intra prediction mode k may be out of a preset angular range. Therefore, there is a need for a method to solve this problem.

According to an embodiment of the present invention, when the angle mode obtained by adding or subtracting an offset to or from a specific angle mode is outside a preset angle range, an angle mode that is cyclically determined from a set of angle modes in a corresponding range may be selected. That is, when the angle mode obtained by adding or subtracting the offset to or from the specific angle mode is outside a preset angle range, an angle mode located on the opposite side of the specific angle mode may be selected from a set of angle modes in a corresponding range. For example, when a set of angle modes of a preset angle range is configured with modes {a, b, c, d, e, f} in ascending order of the intra prediction mode index, mode a may be selected by adding offset1 to mode f, and mode b may be selected by adding offset 2 to mode f. Similarly, mode f may be selected by subtracting offset1 from mode a, and mode e may be selected by subtracting offset 2 from mode a. Referring to FIG. 9, when an offset is added to the vertical diagonal mode VDIA, the horizontal diagonal mode HDIA or an angle mode in the vicinity thereof may be selected. That is, VDIA+1 may be matched to HDIA, and VDIA+2 may be matched to HDIA+1. Also, HDIA−1 may be matched to VDIA, and HDIA−2 may be matched to VDIA−1.

According to another embodiment of the present invention, when the angle mode obtained by adding or subtracting an offset to or from a specific angle mode is outside a preset angle range, the angle mode obtained by adding or subtracting the offset may be ignored. When a preset offset is added to or subtracted from the specific angle mode, an angle mode similar to the specific angle mode may be selected. However, when the angle mode that is determined cyclically as in the previous embodiment is selected, the angle mode located opposite to the specific angle mode is selected so that the similarity between the selected angle modes may be reduced. Therefore, when the angle mode in which the offset is added or subtracted is outside the preset angle range, the corresponding angle may not be selected. For example, among the modes a−offset, a+offset, b−offset, b+offset, c−offset, and c+offset in which an offset is added to or subtracted from the modes {a, b, c} already selected, when mode c+offset is outside the preset angle range, modes a−offset, a+offset, b−offset, b+offset, and c−offset except mode c+offset may be selected.

According to another embodiment of the present invention, when the angle mode obtained by adding or subtracting a first offset to or from a specific angle mode is outside a preset angle range, an angle mode obtained by subtracting or adding a second offset from or to the specific angle mode may be selected. According to another embodiment of the present invention, when the angle mode obtained by adding or subtracting the first offset to or from the specific angle mode is outside the preset angle range, an angle mode obtained by additionally subtracting or adding the second offset from or to the specific angle mode may be selected. In this case, the second offset has a different value from the first offset. For example, when the mode a+offset1 is outside the preset angle range, the mode a−offset2 or the mode a+offset1-offset2 may be selected. Referring to FIG. 9, the angle mode VDIA+1 in which the first offset1 is added to the already selected vertical diagonal mode VDIA may deviate from a preset angle range. In this case, angle mode VDIA−2 in which the second offset 2 is subtracted from angle mode VDIA may be selected. When the angle mode selected by applying the second offset overlaps the angle mode already selected, a third offset different from the second offset may be used similarly to the method described above.

According to another embodiment of the present invention, when the angle mode obtained by adding or subtracting a first offset to or from a specific angle mode is outside a preset angle range, an angle mode obtained by adding or subtracting a second offset to or from the specific angle mode may be selected. In this case, the absolute value of the second offset may be smaller than the absolute value of the first offset. For example, when the mode a+offset1 is outside the preset angle range, the mode a+offset2 may be selected. More specifically, when the angle modes already selected are VDIA and HDIA, VDIA+offset1 may deviate from a preset angle range. Therefore, when the angle modes that are already selected are VDIA and HDIA, VDIA+offset2 may be selected. In addition, referring to FIG. 9, the angle mode VDIA-1+2 in which the first offset 2 is added to the already selected angle mode VDIA−1 may deviate from a preset angle range. In this case, the angle mode VDIA−1+1 in which the second offset1 is added to the angle mode VDIA−1 may be selected. When the angle mode selected by applying the second offset overlaps the angle mode already selected, a third offset different from the second offset may be used similarly to the method described above.

Figure 10:
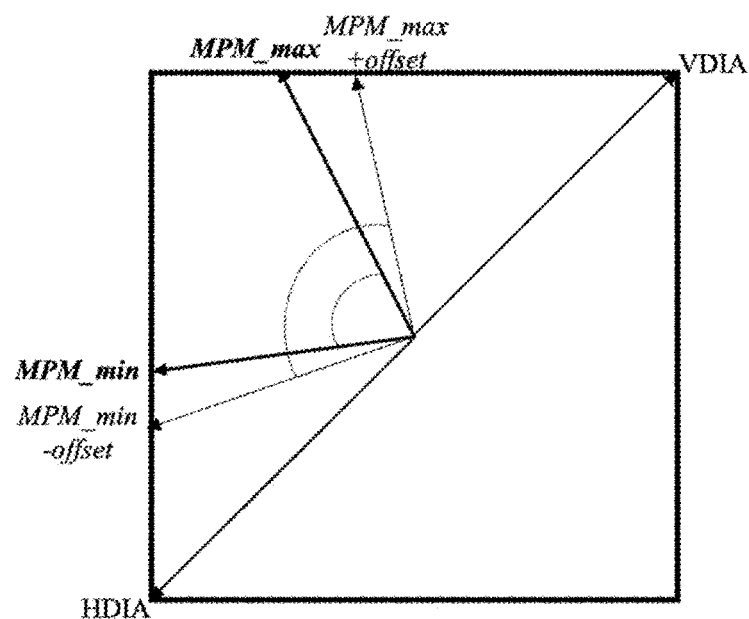
FIG. 10 shows another embodiment of a context condition applied to the intra prediction mode.

FIG. 10 illustrates a method of configuring a prediction mode list considering the minimum and maximum values of the angle or index of angle modes already selected in the prediction mode list as another embodiment of the context condition applied to the intra prediction mode. In an embodiment of the present invention, the prediction mode list may include an MPM list and a selected mode list, but the present invention is not limited thereto.

In intra prediction, the intra prediction mode of the current block may be similar to the intra prediction mode of the neighbor block. For example, the angle mode of the current block may be the same as or similar to any one of angle modes of neighbor blocks. Therefore, when there is a first prediction mode list already configured for the current block, the second prediction mode list may be configured in consideration of elements of the first prediction mode list. According to an embodiment, the second prediction mode list may be configured based on a minimum value and/or a maximum value of an angle or an index (i.e., an intra prediction mode index) of angle modes included in the first prediction mode list. A higher priority than intra prediction modes other than the first and second prediction mode lists may be assigned to the intra prediction modes of the second prediction mode list.

More specifically, when the minimum and maximum values of the angle or index of the angle modes included in the first prediction mode list are 'min' and 'max', respectively, the angle modes included in the second prediction mode list may be selected within a range of 'min' or more and 'max' or less, or a range greater than 'min' and less than 'max'. According to an embodiment, angle modes uniformly distributed (i.e., having a constant index difference or a constant angle difference) between the minimum and maximum values determined based on the first prediction mode list may be included in the second prediction mode list. As such, angle modes included in the second prediction mode list may have a higher priority than angle modes not included in the first or second prediction mode list.

According to another embodiment, angle modes included in the second prediction mode list may be selected within a range of 'min-offset1' or more and 'min+offset2' or less, or a range greater than 'min-offset1' and less than 'min+offset2'. Here, offset1 and offset2 are preset offsets and are non-negative integers. Also, offset1 and offset2 may have the same value or different values. According to one embodiment, when offset1 and offset2 are set to the same value and the range configured based on the offset is outside the preset angle range as in the embodiment of FIG. 9, offset1 and offset2 may be set to different values. According to another embodiment, offset1 and offset2 may be set to the same value or different values based on the distribution of angle modes included in the first prediction mode list. For example, when angle modes included in the first prediction mode list are not uniformly distributed, offset1 and offset2 may be set to different values. Angle modes uniformly distributed between the 'min-offset1' and 'min+offset2' determined based on the first prediction mode list (i.e., having a constant index difference or a constant angle difference) may be included in the second prediction mode list. For example, when the number of modes selected in the second prediction mode list is n, it is configured that m=floor(((max+offset2)−(min−offset1))/(n+1)) and the second prediction mode list may include angle modes corresponding to the indexes or angles 'min-offset1+m', 'min-offset1+2m', . . . , 'min-offset1+nm'. As such, angle modes included in the second prediction mode list may have a higher priority than angle modes not included in the first or second prediction mode list.

Referring to FIG. 10, the first prediction mode list may be an MPM list. In addition, the minimum and maximum values of the indexes of the angle modes included in the MPM list configured according to a preset rule may be referred to as "MPM_min" and "MPM_max", respectively. In this case, the second prediction mode list may be configured based on the MPM list in consideration of the similarity between the current block and the neighbor block as in the above-described embodiment. For example, a second prediction mode list may be configured based on 'MPM_min' and 'MPM_max'. More specifically, angle modes uniformly distributed (i.e., having a constant index difference or a constant angle difference) between "MPM_min-offset" and "MPM_min+offset" may be included in the second prediction mode list. Here, the offset may be a non-negative integer.

When the second prediction mode list is configured based on the first prediction mode list as in the above-described embodiments, intra prediction using the first and second prediction mode lists may be performed. According to an embodiment, the second prediction mode list may be used as a selected mode list. According to another embodiment, the second prediction mode list may indicate intra prediction modes signaled by an index configured with k−1 bits among non-MPM modes signaled using k−1 or k bits. Further, the first prediction mode list and the second prediction mode list may refer to the first set and the second set of the same prediction mode list. That is, in the embodiment of FIG. 10 described above, the first prediction mode list and the second prediction mode list may be replaced with a first set of prediction mode lists and a second set of prediction mode lists, respectively. Here, the prediction mode list may be an MPM list or a selected mode list.

Figure 11:
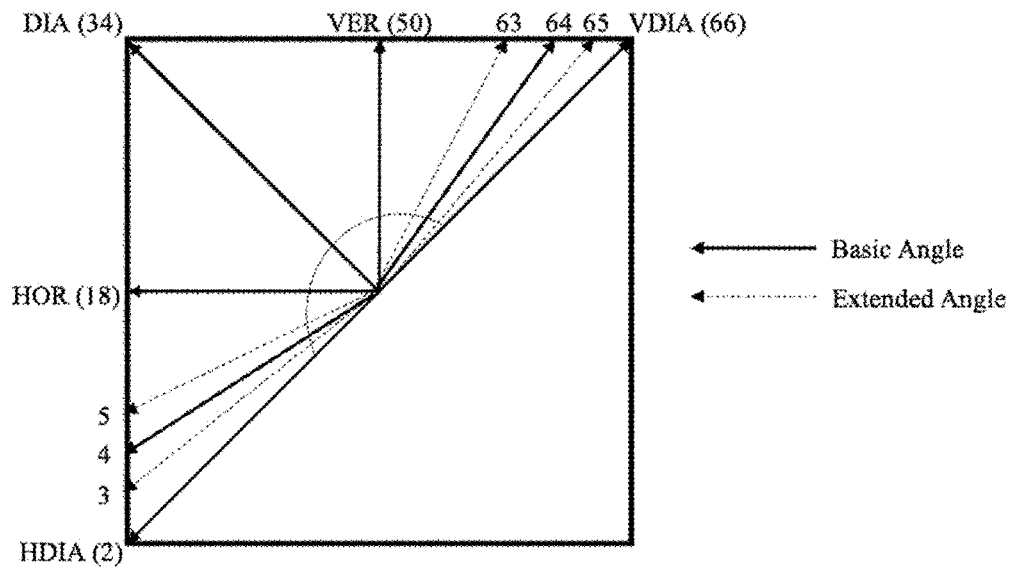
FIG. 11 shows another embodiment of a context condition applied to the intra prediction mode.

FIG. 11 illustrates a method of configuring a prediction mode list considering a basic angle mode as another embodiment of context conditions applied to the intra prediction mode. As described above, the plurality of angle modes configuring the intra prediction mode set may include a basic angle mode and an extended angle mode.

According to an embodiment of the present invention, the prediction mode list may be configured by first considering the basic angle mode. Angle modes included in the prediction mode list may have a higher priority than angle modes not included in the list. According to an embodiment, a method of configuring a prediction mode list by first considering the basic angle mode may be applied under conditions in which neighbor blocks use the basic angle mode. In addition, the method of configuring the prediction mode list by considering the basic angle mode first may be applied under the condition that the number of neighbor blocks using the basic angle mode is greater than or equal to a threshold.

In the intra prediction mode determination step of the encoder, performing a rate-distortion (RD) cost calculation for all selectable (defined) angle modes may be a burden in terms of complexity. Therefore, in order to reduce the complexity in the intra prediction mode determination step, the encoder may select an intra prediction mode by first performing rate-distortion cost calculation only for preset angle modes, for example, basic angle modes. Next, the encoder may select an intra prediction mode by additionally performing rate-distortion cost calculation for neighboring angle modes of the selected basic angle mode.

Considering the similarity between the current block and the neighbor blocks and the embodiment of the encoder implementation described above, it is highly possible that the current block may use the basic angle mode. Therefore, it is possible to configure the prediction mode list with priority based on the basic angle mode. When the number of elements in the prediction mode list to be configured is less than the total number of basic angle modes, the prediction mode list may be configured by selecting some of the basic angle modes. For example, when the number of basic angle modes is 33 and the number of elements in the prediction mode list to be configured is 16, every other basic angle mode may be selected starting with any one of the entire basic angle modes. That is, angle modes 4, 8, 12, 16, . . . , 60, and 64 may be selected in the embodiment of FIG. 13. According to an embodiment, the prediction mode list configured with the selected intra prediction modes may be used as a selected mode list. As another embodiment of the present invention, the number of elements of the prediction mode list to be configured may be defined based on the number of basic angle modes. For example, when the number of basic angle modes is 33, the number of elements in the prediction mode list to be configured may be defined as 33 or 32 (=33-1).

As described above, the extended angle mode may be signaled based on the basic angle mode. The extended angle mode may be signaled using the intra prediction mode index for the basic angle mode. For example, when a prediction mode list based on a basic angle mode is configured, the extension angle may be signaled through an offset or an on/off flag with reference to the list. More specifically, when the prediction mode list is configured based on the basic angle mode {a, b, c, d}, offsets {offset1, offset2, offset3, offset4} corresponding to each angle mode may be signaled. The angle modes {a+offset1, b+offset2, c+offset3, d+offset4} may be indicated based on the signaled offset. According to another embodiment, a flag indicating whether to use an offset corresponding to the basic angle mode may be separately transmitted. For example, a flag corresponding to the basic angle mode a may be transmitted, and when the value of the flag is 1, angle mode a+offset1 is indicated, and when the flag value is 0, angle mode a may be indicated.

Figure 12:
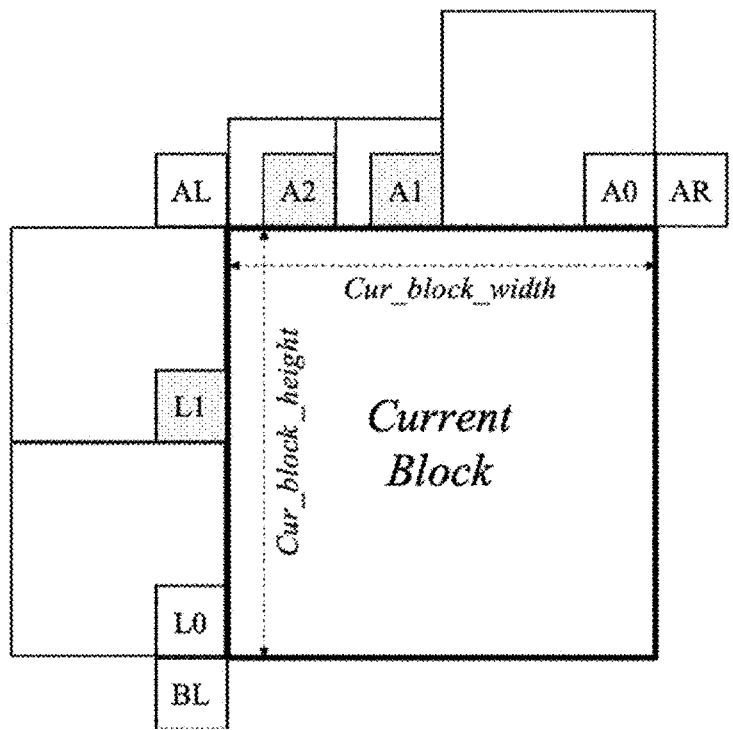
FIG. 12 illustrates an embodiment referring to neighbor blocks for intra prediction of a current block.

FIG. 12 illustrates an embodiment referring to neighbor blocks for intra prediction of a current block. In FIG. 12, it is assumed that there are a plurality of neighbor blocks neighboring to the left or upper boundary of the current block. Hereinafter, a method of configuring a prediction mode list for the current block with reference to neighbor blocks of the current block is described. The prediction mode list includes an MPM list, a selected mode list and non-selected mode list itself, or some sets thereof, and the present invention is not limited thereto.

1) Method of configuring MPM list (first method). According to an embodiment of the present invention, the MPM list for the current block may be configured in the following way. When there are a plurality of neighbor blocks neighboring to the left or upper boundary of the current block, information of intra prediction modes used in the blocks may be comprehensively considered. In this case, a neighbor block neighboring to the left or upper boundary of the current block refer to a block neighboring to the left side having the length of the height 'Cur_block_height' of the current block or the upper side having the length of the width 'Cur_block_width' of the current block.

For example, as shown in FIG. 12, when blocks L0 and L1 are neighboring at the left boundary of the current block and blocks A0, A1 and A2 are neighboring at the upper boundary, the MPM list may be configured by referring to the intra prediction modes used in the corresponding blocks. In this case, the order of referring to neighbor blocks neighboring to the current block may be configured in the following embodiments.

According to the first embodiment, the MPM list may be configured in the order of {mode of block L0, mode of block L1, ..., mode of block A0, mode of block A1, ..., planar mode, DC mode, mode of block BL, mode of block AR, mode of block AL}. That is, the MPM list may be configured by referring to blocks neighboring at the left boundary of the current block and blocks neighboring at the upper boundary in order. According to the second embodiment, the MPM list may be configured in the order of {mode of block L0, mode of block A0, mode of block L1, mode of block A1, mode of block L_x, mode of block A_x, mode of block L_x+1, mode of block A_x+1, ..., planar mode, DC mode, mode of block BL, mode of block AR, mode of block AL}. That is, the representative block L0 neighboring to the left boundary of the current block and the representative block A0 neighboring to the upper boundary of the current block are first referred to, and the remaining blocks neighboring to the left boundary of the current block and the remaining blocks neighboring to the upper boundary of the current block are alternately referred to in order, thereby configuring the MPM list. According to the third embodiment, the MPM list may be configured in the order of {mode of block L0 mode, mode of block A0, planar mode, DC mode, mode of block BL, mode of block AR, mode of block AL, mode of block L1, ..., mode of block A1, ... }. That is, the representative block L0 neighboring to the left boundary of the current block and the representative block A0 neighboring to the upper boundary of the current block are first referred to, planar mode and DC mode are added, and then, the remaining blocks neighboring at the left boundary of the current block and the remaining blocks neighboring at the upper boundary of the current block are alternately referred to in turn, thereby configuring the MPM list. According to another embodiment, an average value or a representative value based on intra prediction modes of blocks neighboring to the left or upper boundary of the current block may be extracted, and by using this, the MPM list may be configured. On the other hand, in the above-described embodiments, the representative block neighboring to the left/upper boundary of the current block may be configured with blocks at positions other than L0 and A0. For example, blocks closest to the middle point of the left side and the middle point of the upper side of the current block may be configured as representative blocks.

On the other hand, although it is shown in FIG. 12 that the numbers of neighbor blocks neighboring to the left or upper boundary of the current block are 2 and 3, respectively, the above-described embodiments can be extended and applied even when the number of neighbor blocks increases. Also, although the above embodiments have been described based on neighbor blocks on the left and upper sides of the current block, this may be similarly applicable to neighbor blocks located on the below left BL, above right AR, and above left AL of the current block. A specific embodiment of this will be described with reference to FIG. 13. If the MPM list is not filled by the above methods, the MPM mode may be added to the MPM list by applying a preset offset to angle modes already selected. That is, the angle mode obtained by adding or subtracting a preset offset to or from angle modes already selected in the MPM list is added to the MPM list. In this case, the preset offset is an integer other than 0.

2) Method of configuring selected mode list (second method). The selected mode list may be configured based on intra prediction modes used in neighbor blocks of the current block. In addition, various embodiments of priority with reference to neighbor blocks described in the first method may be applied when configuring the selected mode list. When the selected mode list is not filled by the method described above, a selected mode may be added to the selected mode list by applying a preset offset to angle modes already selected. That is, the angle mode obtained by adding or subtracting a preset offset to or from angle modes that are already selected in the selected mode list is added to the selected mode list. In this case, the preset offset is an integer other than 0.

According to another embodiment of the present invention, when applying the first method, lower-level modes not included in the MPM list among intra prediction modes of neighbor blocks may be preferentially included in the selected mode list. When the selected mode list is not filled by such a method, a selected mode may be added to the selected mode list by applying a preset offset to angle modes already selected. According to another embodiment, the selected mode list may be configured by applying a preset offset (i.e., offset1) to angle modes of neighbor blocks. For example, the following selected mode list may be configured based on angle modes other than the planar mode and the DC mode in any one embodiment of the first methods. {mode +/−offset1 of block L0, mode +/−offset1 of block L1, . . . , mode +/−offset1 of block A0, mode +/−offset1 of block A1, . . . , mode +/−offset1 of block BL, mode +/−offset1 of block AR, mode +/−offset1 of block AL}. In this case, the preset offset may be determined in various ways. For example, the offset is a positive integer and may be configured so that the value thereof starts from 1 and increases by one. Also, the offset is a positive integer and may be configured so that the value thereof starts from 1 and is increased by a multiple of 2. Further, the offset may be increased starting from an integer whose initial value is greater than 1, and the increased scale may be extended to a multiple of 2 or a multiple of 3. In addition, the offset may be configured to be smaller gradually, starting from a preset initial value (e.g., 10).

3) Method of configuring non-selected mode list (third method). Even when configuring a non-selected mode list, intra prediction modes used in neighbor blocks of the current block may be used similar to the first method described above. For example, when a non-selected mode list is configured with 45 intra prediction modes and signaled with truncated binary binarization, the upper-level 19 modes may be signaled with one less bit than the mode after the 20th mode. In other words, the intra prediction modes in the non-selected mode list may be divided into a first set signaled by an index configured with 1-1 bits and a second set signaled by an index configured with 1 bits. In this case, angle modes selected based on a priority for referring to neighbor blocks according to the first method described above may be included in the first set. When the first set is not filled in such a method, angle modes obtained by applying a preset offset to angle modes already selected in the first set may be added to the first set.

According to another embodiment of the present invention, lower-level modes not included in the MPM list and/or the selected mode list among intra prediction modes of neighbor blocks may be preferentially included in the first set. When the first set is not filled in such a method, angle modes obtained by applying a preset offset to angle modes already selected in the first set may be added to the first set. According to another embodiment, similar to the second method, the first set may be configured as follows based on angle modes of neighbor blocks. {mode +/−offset2 of block L0, mode +/−offset2 of block L1, . . . , mode +/−offset2 of block A0, mode +/−offset2 of block A1, . . . , mode +/−offset2 of block BL, mode +/−offset2 of block AR, mode +/−offset2 of block AL}. In this case, the preset offset (i.e., offset2) used to configure the first set may be set to a different value from the offset used in the MPM list configuration and the offset (i.e., offset1) used in the selected mode list configuration.

Figure 13:
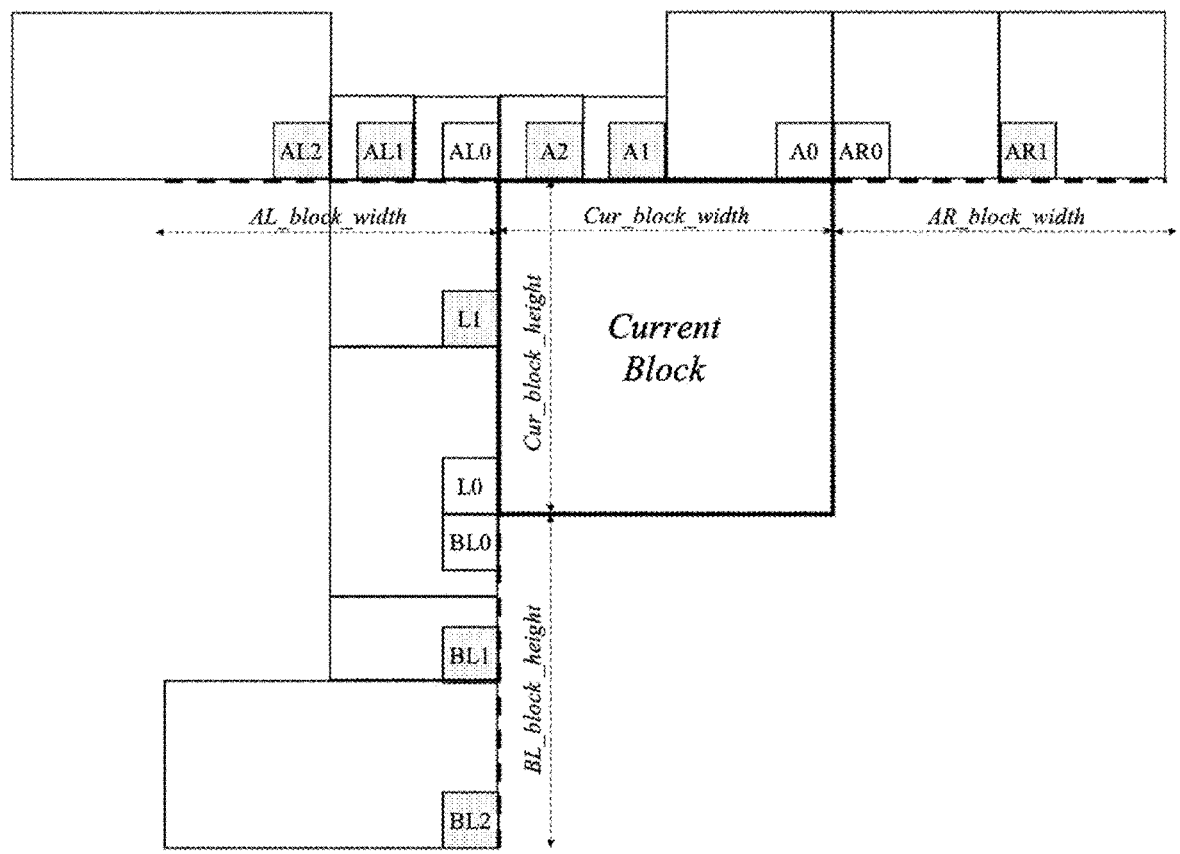
FIG. 13 illustrates another embodiment referring to neighbor blocks for intra prediction of a current block.

FIG. 13 illustrates another embodiment referring to neighbor blocks for intra prediction of a current block. The embodiment of FIG. 12 that performs intra prediction of a current block with reference to a plurality of neighbor blocks can be extended and applied to neighbor blocks located on the below left BL, above right AR, and above left AL of the current block as well as the left L and above A of the current block.

The definition of a neighbor block located on the left or upper side of the current block may be the same as that of the embodiment of FIG. 12. Additionally, neighbor blocks located on the below left BL, above right AR, and above left AL of the current block may be defined. First, neighbor blocks located on the below left BL of the current block may indicate blocks neighboring to a surface extending downward by the length 'BL_block_height' from the left side of the current block. In addition, neighbor blocks located on the above right AR of the current block may indicate blocks neighboring to a surface extending to the right by the length 'AR_block_width' from the upper side of the current block. In the same manner, neighbor blocks located on the above left AL of the current block may indicate blocks neighboring to a surface extending to the left by the length 'AL_block_width' from the upper side of the current block. According to an embodiment, the length of 'BL_block_height' may be configured equal to the length of 'Cur_block_height' or an integer multiple of the length of 'Cur_block_height'. Also, the lengths of 'AR_block_width' and 'AL_block_width' may be configured equal to the length of 'Cur_block_width' or may be set to an integer multiple of the length of 'Cur_block_width'. In this case, all available blocks among blocks of the corresponding position may be referenced for intra prediction of the current block. Alternatively, the size of a block available for reference may be previously defined, and only blocks having a size smaller or larger than the corresponding size may be referenced for intra prediction of the current block. In addition, when the current block is a block other than a square, the shape of the neighbor block may be different according to the size of the current block.

For example, as shown in FIG. 13, when the neighbor blocks located on the lower left side BL of the current block are BL0, BL1 and BL2, the neighbor blocks located on the above right AR of the current block are AR0 and AR1, and the neighbor blocks located on the above left AL of the current block are AL0, AL1 and AL2, the prediction mode list may be configured in the following order. {mode of block L0, mode of block L1, . . . , mode of block A0, mode of block AL, . . . , planar mode, DC mode, mode of block BL0, mode of block BL1, mode of block BL2, . . . , mode of block AL0, mode of block AL1, . . . , mode of block AR0, mode of block AR1, . . . }. According to an embodiment of the present invention, the MPM list may be configured based on the configuration order of the prediction mode list. In addition, the selected mode list may be configured using only angle modes in the prediction mode list, and when the selected mode list cannot be filled, a selected mode can be added to the selected mode list by applying a preset offset to angle modes already selected. Also, a first set of a non-selected mode list may be configured using only angle modes in the prediction mode list, and similarly, when the first set is not filled, angle modes obtained by applying a preset offset to angle modes already selected in the first set may be added to the first set. The prediction mode list configuration embodiments considering the neighbor blocks described with reference to FIG. 12 may be equally applied to the extended neighbor blocks according to FIG. 13.

Figure 14:
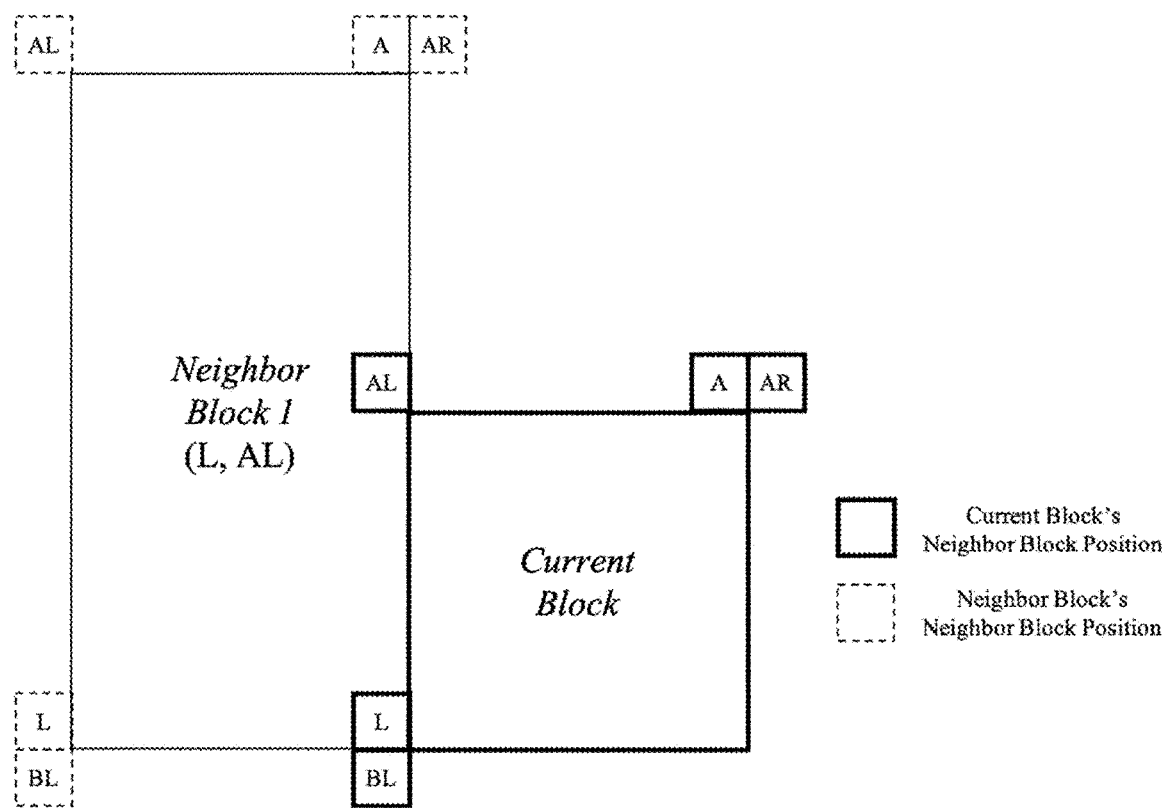
FIG. 14 shows an embodiment referring to an MPM list of neighbor blocks for intra prediction of a current block.

FIG. 14 shows an embodiment referring to an MPM list of neighbor blocks for intra prediction of a current block. When configuring the MPM list for the current block, the MPM list of the corresponding blocks as well as the intra prediction mode of neighbor blocks may be additionally referred to. More specifically, an intra prediction mode of neighbor blocks for intra prediction of the current block, an intra prediction mode included in the MPM list of neighbor blocks, an intra prediction mode of neighbor blocks of neighbor blocks, and an intra prediction mode included in the MPM list of neighbor blocks may be referred to. That is, this is not limited to neighbor blocks of the first step (1st tier) of the current block and the intra prediction mode of the current block may be signaled using intra prediction information of a wider range of neighbor blocks such as neighbor blocks of the second step (2nd tier) and neighbor blocks of the third step (3rd tier). Here, the intra prediction information of the block includes at least one of the intra prediction mode and MPM list information of the block.

Referring to FIG. 14, when the left neighbor block (i.e., Neighbor block 1) of the current block is coded as the intra prediction mode, the intra prediction modes included in the MPM list of the neighbor block may be preferentially considered for intra prediction mode signaling of the current block. That is, in order to signal the intra prediction mode of the current block, modes in the following order may be referred to. {mode of block L, mode of block A, planar mode, DC mode, mode of block BL, mode of block AR, NB1_MPM0 mode, NB1_MPM1 mode, NB1_MPM2 mode, . . . , NB2_MPM0 mode, NB2_MPM1 mode, NB2_MPM2 mode, . . . }. Here, the NBx_MPMy mode indicates intra prediction information of the x-th neighbor block of the current block. That is, the NBx_MPMy mode may indicate intra prediction mode information of the x-th neighbor block or y-th intra prediction mode information of the MPM list of the corresponding block. In this case, if the y-th mode is a non-angle mode such as planar mode or DC mode, it may not be considered in the current block.

According to an embodiment of the present invention, intra prediction mode information for neighbor blocks may be variously modified and combined to be used for intra prediction for the current block. For example, embodiments may be modified or extended based on the shape of the current block (i.e., square block, rectangular block) and the shape of the neighbor block, and the ordered pairs may be extended and applied in various combinations. An embodiment of utilizing intra prediction modes included in the MPM list of neighbor blocks for intra prediction mode signaling of the current block may be combined with the above-described embodiments. That is, when at least one of the MPM list of the current block, a set of upper-level modes signaled by an index configured with k−1 bits among non-MPM modes, a selected mode list, and a set of upper-level modes signaled by an index configured with 1-1 bits of non-selected modes is configured, modes included in the MPM list of neighbor blocks may be referred to. Also, when the corresponding list or set is not filled in each case, angle modes obtained by applying a preset offset to angle modes already included in the corresponding list or set may be added to the corresponding list or set.

Figure 15:
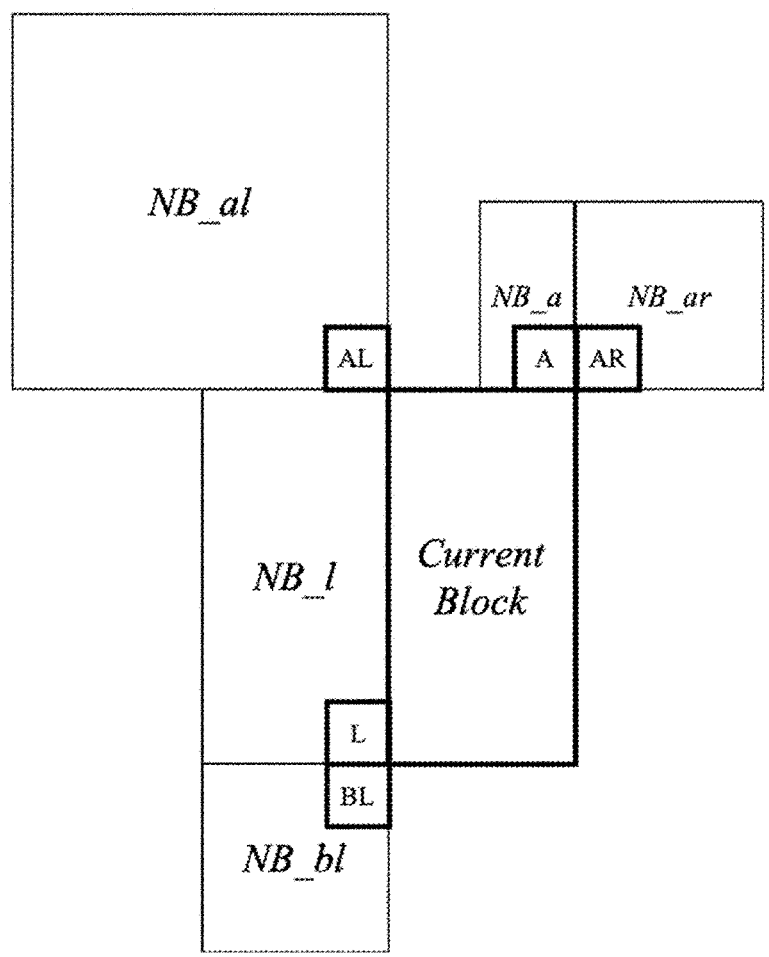
FIG. 15 shows an embodiment in which the shape and/or size of the current block and neighbor blocks are considered for intra prediction of the current block.

FIG. 15 shows an embodiment in which the shape and/or size of the current block and neighbor blocks are considered for intra prediction of the current block. When configuring the MPM list of the current block, intra prediction information of a block having a similar shape and/or size to the current block among neighbor blocks may be preferentially referred to. Here, the intra prediction information includes at least one of intra prediction mode and MPM list information. Whether the shapes of the current block and the neighbor blocks are similar may be determined based on whether both blocks are square blocks, whether both blocks are vertical blocks, and whether both blocks are horizontal blocks. When both blocks are vertical blocks or horizontal blocks, the ratio between the width and height of each block may be additionally considered. In addition, in the embodiment of the present invention, the shape of the block is not limited to the above-described cases, and may be extended to a non-uniform rectangular block, a diagonal block, or the like.

More specifically, when the current block is a vertical block, intra prediction information used in a vertical block (i.e., NB_1, NB_a) among neighbor blocks may be preferentially referred to when configuring the MPM list of the current block. In addition, when the size of the current block is 16×32, intra prediction information used in a block of the same size (i.e., NB_1) among neighbor blocks may be preferentially referred to when configuring the MPM list of the current block. The embodiment of signaling the intra prediction mode of the current block in consideration of the shape and/or size of the current block and neighbor blocks may be combined with the above-described embodiments. That is, when at least one of the MPM list of the current block, a set of upper-level modes signaled by an index configured with k−1 bits among non-MPM modes, a selected mode list, and a set of upper-level modes signaled by an index configured with 1-1 bits of non-selected modes is configured, intra prediction information of a block having a similar shape and/or size to the current block among the neighbor blocks may be preferentially referred to. Also, when the corresponding list or set is not filled in each case, angle modes obtained by applying a preset offset to angle modes already included in the corresponding list or set may be added to the corresponding list or set.

Figure 16:
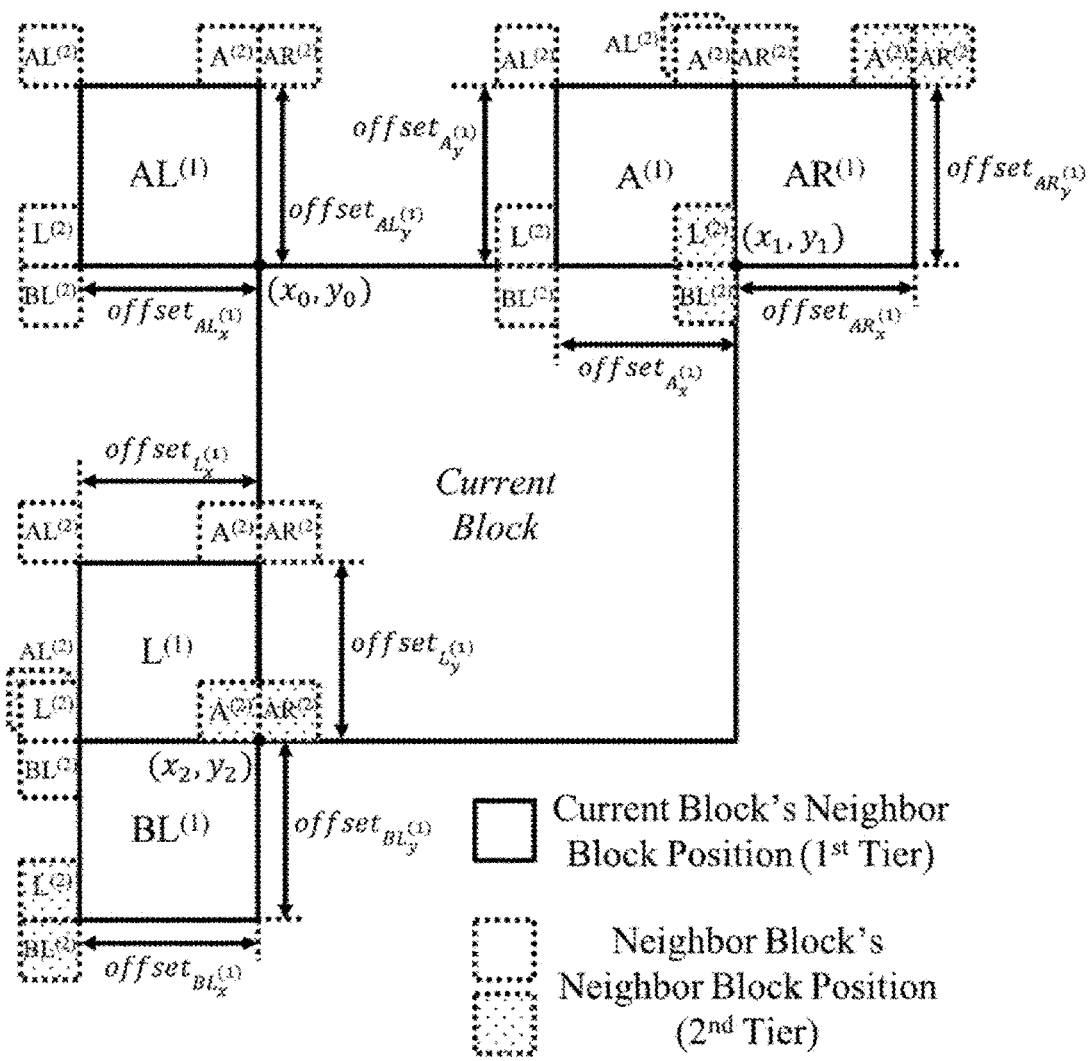
FIGS. 16 to 18 illustrate expanded embodiments of obtaining prediction information of a current block with reference to prediction information of neighbor blocks.
Figure 17:
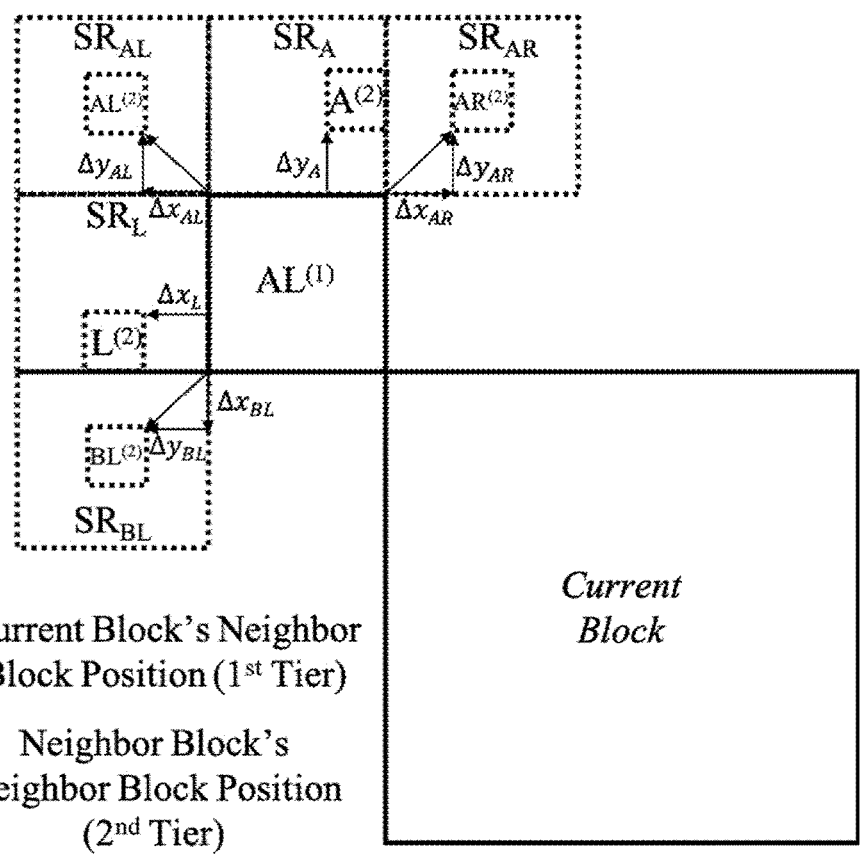
Figure 18:
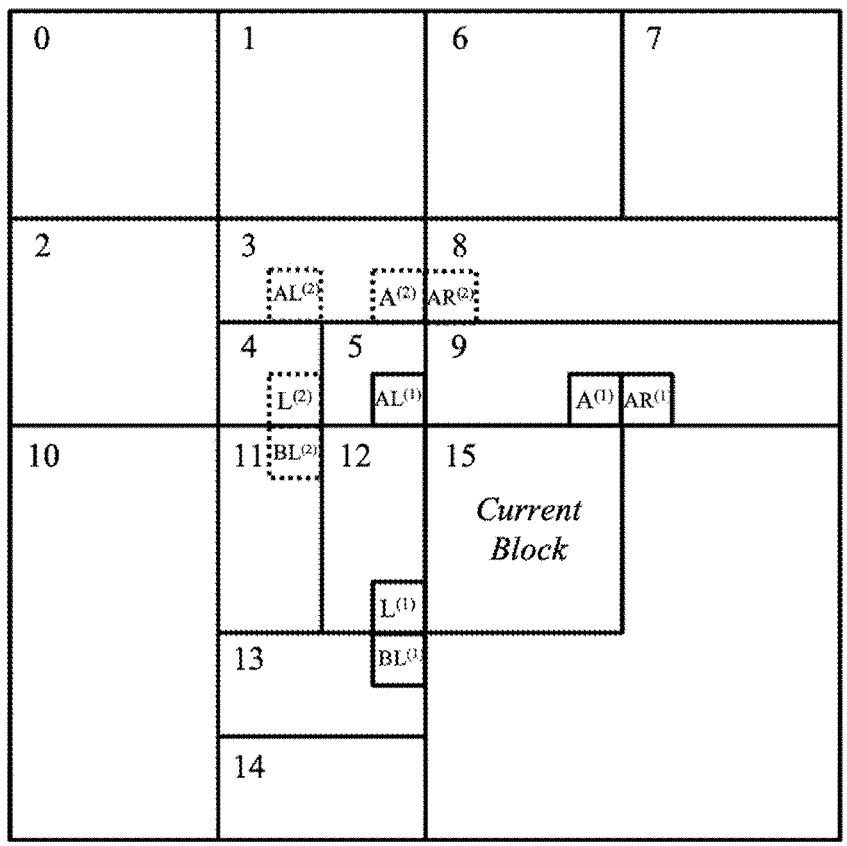

FIGS. 16 to 18 illustrate expanded embodiments of obtaining prediction information of a current block with reference to prediction information of neighbor blocks. According to an embodiment of the present invention, a block referenced in signaling prediction information of a current block may be extended to neighbor blocks neighboring to the current block as well as neighbor blocks not neighboring to the current block. With reference to each drawing, an embodiment in which intra prediction information of a current block is obtained by referring to intra prediction information of neighbor blocks will be described. According to an embodiment, the MPM list of the current block may be configured with reference to intra prediction information of neighbor blocks. However, the present invention is not limited to this, and each embodiment may be similarly applied to a case of obtaining inter prediction information of a current block by referring to inter prediction information of neighbor blocks. Here, the inter prediction information may include a motion vector, a reference picture index, and the like.

First, FIG. 16 shows an embodiment of extended neighbor blocks referenced to obtain prediction information of a current block. As described above, the MPM list of the current block may be configured using the intra prediction mode of neighbor blocks by reflecting the regional similarity of the picture. In this case, the neighbor blocks L (1), A (1), BL (1), AR (1), and AL (1) neighboring to the boundary of the current block may be defined as first step (1st tier) neighbor blocks, and the neighbor blocks L (2), A (2), BL (2), AR (2), and AL (2) neighboring to the boundary of each first step neighbor block may be defined as second step (2nd tier) neighbor blocks. For example, the lowest block L(1) neighboring to the left boundary of the current block is a first step neighbor block, and blocks L (2), A (2), BL (2), AR (2) and AL (2) neighboring to the left or upper boundary of block L(1) are second step neighbor blocks. In this case, among the blocks neighboring to the first step neighbor block, the block overlapping the current block is excluded from the second step neighbor block. That is, since the upper right block AR(2) of the block L(1) overlaps the current block, it is not referenced when configuring the MPM list of the current block. Similarly, since the block BL(2) neighboring to the block A(1), the block AR(2) neighboring to the block BL(1), and the block BL(2) neighboring to the block AR(1) also overlap the current block, they are not referenced when configuring the MPM list.

In FIG. 16, an embodiment in which up to 25 second step neighbor blocks are expanded for 5 first step neighbor blocks located on the left or upper side of the current block is illustrated, but the present invention is not limited thereto. That is, the embodiment of the present invention can be extended to a maximum of N^2 second step neighbor blocks for N first step neighbor blocks located on the left or upper side of the current block. In this case, the MPM list of the current block may be configured by referring to the intra prediction mode of up to N^2+N neighbor blocks within a preset range from the current block. Therefore, the regional characteristics of the picture may be reflected more than when configuring the MPM list by referring only to the intra prediction mode of N first step neighbor blocks. In addition, the probability that the optimal intra prediction mode of the current block is present in the MPM list increases, so that a reduction in the amount of bits required for intra prediction mode coding can be expected.

In order to determine the exact position of the second step neighbor blocks of the current block, the size of the first step neighbor block and the position information of at least one of the upper left, upper right, lower left and lower right vertices of the corresponding block are required. When the above information is not stored in the encoder and decoder, by adding the offset to the reference coordinate of the first step neighbor block, coordinates of each second step neighbor block can be obtained. For example, when the lower right reference coordinate of the block AL(1) is (x0, y0), the reference positions of the blocks L(2), A(2), BL(2), AR(2), and AL(2) may be determined as (x0-offset-1, y0-1), (x0-1, y0-offset-1), (x0-offset-1, y0+1), (x0+1, y0-offset-1), and (x0-offset-1, y0-offset-1), respectively. Here, the offset is an integer greater than 0, and the offset in the x-axis direction and the offset in the y-axis direction may be set to the same value or different values. According to another embodiment, the offset may be determined based on the size of the current block. That is, the offset may be configured to be proportional to the size of the current block. For example, if the width and height of the current block are {64, 32} respectively, the offset in the x-axis direction and the offset in the y-axis direction may be set to {64, 32}, {32, 16}, {16, 8}, {8, 4}, etc. obtained by dividing the width and height by integers, respectively. Since the encoder and decoder use the same offset according to a predefined rule, both the encoder and decoder can refer to the intra prediction mode of the second step neighbor block at the same position.

According to another embodiment of the present invention, if the MPM list of the first step neighbor blocks L(1), A(1), BL(1), AR(1) or AL(1) of the current block is configured, the encoder and decoder may configure the MPM list of the current block by referring to the intra prediction modes included in the MPM list of the first step neighbor block without searching for the second step neighbor block. Since the MPM list of the first step neighbor block refers to the prediction mode of the second step neighbor blocks of the current block when the MPM list is configured, the prediction mode of the second step neighbor blocks may be included in the MPM list of the first step neighbor block. Therefore, by referring to the MPM list of the first step neighbor block, without the search and position calculation process of the second step neighbor block, the prediction mode of the second step neighbor block may be referred. On the other hand, storing all the MPM list information of the first step neighbor blocks may cause a burden on the memory. Therefore, according to another embodiment of the present invention, the encoder and decoder can configure the MPM list of the current block by storing and referring to only the upper-level M intra prediction modes included in the MPM list of the first step neighbor block. For example, if the size of the MPM list is 6 and intra prediction modes of the upper-level 3 MPM indexes (i.e., index=0, 1, 2) are referenced, the MPM list of the current block can be configured by referring to the intra prediction mode of first step neighbor blocks L(1), A(1), BL(1), AR(1), and AL(1) and the intra prediction indicated by the upper-level 3 MPM indexes of the MPM list of each block. According to an embodiment, the planar mode and the DC mode may be excluded from the above-described upper-level M intra prediction modes.

FIG. 17 shows another embodiment of extended neighbor blocks referenced to obtain prediction information of a current block. According to another embodiment of the present invention, a preset search range based on the current block may be used to obtain prediction information of the current block.

Referring to FIG. 17, the second step neighbor blocks L(2), A(2), BL(2), AR(2), and AL(2) may be defined in a rectangular search range based on the top left, bottom left, and right top vertex coordinates of the first step neighbor block. In this case, the second step neighbor block may be searched while moving by a predetermined step size in the x-axis and/or y-axis direction within the search range. For example, in order to search the second step neighbor block L(2) for the first step neighbor block AL(1) of the current block, the block L(2) may be searched while moving by a predetermined step size in the x-axis direction from the lower left coordinate reference point of the block AL(1). In this case, the search may be performed until a block having prediction information different from the prediction information of the block AL(1) is found within a predetermined search range. In addition, in order to search the second step neighbor block A(2) for the first step neighbor block AL(1) of the current block, the block A(2) may be searched while moving by a predetermined step size in the y-axis direction from the upper right coordinate reference point of the block AL(1). In the same manner, in order to search the AL(2), AR(2), and BL(2) blocks, that is, the second step neighbor blocks, the second step neighbor block may be searched while moving by a predetermined step size in the x-axis and/or y-axis direction from the upper left, upper right, and lower left coordinate reference points of the block AL(1), respectively.

According to an embodiment of the present invention, the search range may be set to a fixed size such as 16×16, 32×32, 64×64, or may be configured according to the size of the current block. That is, the search range may be configured to be proportional to the width and/or height of the current block. For example, when the size of the current block is 128×128, the search range may be set to 128×128, 64×64, 32×32, 16×16, 8×8, etc. by dividing the block size by an integer. The step size for searching in the search range may be set to a value equal to or greater than the minimum size of the block and smaller than the search range. For example, when the minimum size of a block in the 64×64 search range is 4×4, the step size may be set to 4, 8, 16, or 32. According to an embodiment of the present invention, searching for prediction information within a search range may be performed until all of the preset prediction mode lists are filled. That is, when the prediction information searched by the first step size in the search range is included in the prediction mode list and the prediction mode list is not filled, prediction information searched with a second step size within the search range is added to the prediction mode list. The encoder and decoder may perform the search while increasing the step size for searching until the prediction mode list is filled. Meanwhile, since each search range and step size are natural numbers and are used with the same predefined value in the encoder and decoder, both the encoder and the decoder may refer to the prediction mode of the same second step neighbor block.

FIG. 18 shows another embodiment of extended neighbor blocks referenced to obtain prediction information of a current block. When the encoder and decoder recognize the structure of the neighbor block of the current block, that is, the size of the block and the upper-left coordinates of the block, the encoder and decoder can determine the position of the second step neighbor block with respect to the current block. In the sub blocks shown in FIG. 18, the upper left number indicates the encoding or decoding order, and means that the current block is encoded or decoded in the 15th time.

In order to determine the position of the second step neighbor blocks of the current block (i.e., the 15th block), the coordinates of at least one of the four reference points of the upper left, upper right, lower left, and lower right of each of the first step neighbor blocks and width and height information of the corresponding block may be utilized. For example, the reference positions of the second step neighbor blocks L(2), A(2), BL(2), AR(2), and AL(2) for the first step neighbor block AL(1) of the current block are respectively calculated as (x0-1, y0+h-1), (x0+w-1, y0-1), (x0-1, y0+h+1), (x0+w+1, y0-1), and (x0-1, y0-1). In this case, (x0, y0) is the upper left coordinate of the fifth block, which is the first step neighbor block of the current block, and w and h are the width and height of the corresponding block, respectively. The position of each second step neighbor blocks may be calculated for the remaining first step neighbor blocks L(1), A(1), BL(1), and AR(1) in the same manner, and the MPM list of the current block may be configured by referring to the intra prediction mode of the second step neighbor blocks.

According to a further embodiment of the present invention, the occurrence frequency of the prediction mode in neighbor blocks may be considered when obtaining prediction information of the current block. That is, instead of the prediction mode with a low occurrence frequency in neighbor blocks, a prediction mode having a high occurrence frequency in neighbor blocks may be referred to for prediction of the current block with high priority. According to an embodiment, in consideration of the occurrence frequency of each of the prediction mode of the first step neighbor block and the prediction mode of the second step neighbor block, the priority between prediction modes included in the MPM list of the current block may be determined. A specific embodiment of this will be described with reference to FIG. 19.

Figure 19:
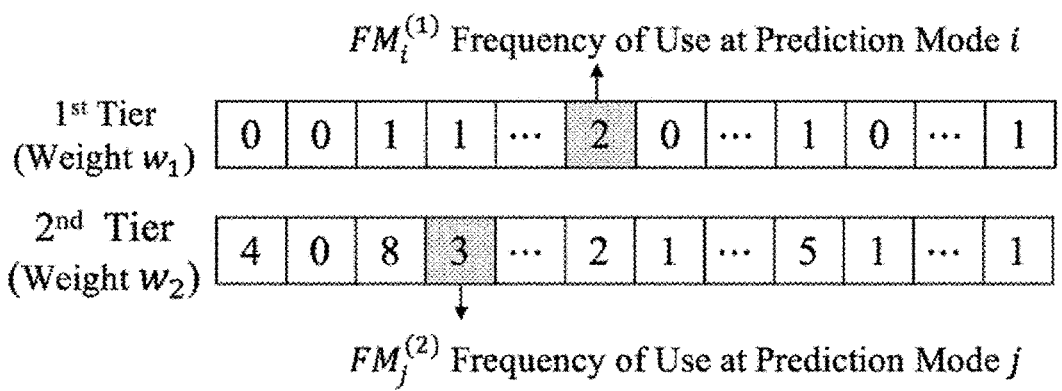
FIG. 19 shows an embodiment of setting the priority of the intra prediction mode based on the occurrence frequency of the intra prediction mode of neighbor blocks.

FIG. 19 shows an embodiment of configuring the priority of the intra prediction mode based on the occurrence frequency of the intra prediction mode of neighbor blocks. First, the occurrence frequency for L(1), A(1), BL(1), AR(1), and AL(1), i.e., the first step neighbor blocks, and L(2), A(2), BL(2), AR(2), and AL(2), i.e., the second step neighbor blocks, of the current block is calculated. The occurrence frequency of the prediction mode of the first step neighbor blocks and the occurrence frequency of the prediction mode of the second step neighbor blocks are stored in different lists (i.e., the first list and the second list) and increase by 1 when the prediction mode for the neighbor block of the corresponding step is confirmed. For example, if the intra prediction mode of block L(1) is mode 50, the occurrence frequency of mode 50 in the first list is increased by 1, and the occurrence frequency of mode 50 in the second list is not increased. When calculation of the occurrence frequency of the prediction mode of the first step neighbor blocks and the second step neighbor blocks is completed, the final occurrence frequency for each prediction mode may be calculated through the weighted sum of the occurrence frequencies. More specifically, the final occurrence frequency $FM_i$ of the specific mode i may be calculated as in Equation 1 below.

$$FM_i = (w_1 FW_i^{(1)} + w_2 FW_i^{(2)} + 2^{shift-1}) \gg shift \quad \text{[Equation 1]}$$

Here, $FW_i^{(1)}$ is the occurrence frequency of mode i in the first step neighbor blocks, and $FW_i^{(2)}$ is the occurrence frequency of mode i in the second step neighbor blocks, and $w_1$ and $w_2$ are weights.

For example, referring to FIG. 19, when the occurrence frequencies of the first step neighbor blocks and the second step neighbor blocks for the intra prediction mode 50 are 2 and 3, respectively, the final occurrence frequency of the intra prediction mode 50 may be calculated as $w_1*3+w_2*2$. In this case, a bit shift operation may be additionally applied to compensate for the increase in scale by the weights $w_1$ and $w_2$. In addition, the weights $w_1$ and $w_2$ may be set to an integer greater than 0 to avoid real multiplication operations, thereby increasing the scale of the weighted sum, and the scale may be corrected by a bit shift operation.

According to an embodiment of the present invention, the weights $w_1$ and $w_2$ may be determined based on various embodiments. According to an embodiment, $w_1$ may be set to a value greater than $w_2$ because the first step neighbor block is closer to the current block than the second step neighbor block. For example, $w_1$ and $w_2$ may be set to 5 and 3, respectively. According to another embodiment, the weights $w_1$ and $w_2$ may be variably configured according to corresponding prediction modes. That is, $w_1$ and $w_2$ are not configured equally for all the prediction modes in the same list, but are variably configured according to the prediction mode, so that the occurrence of a specific prediction mode may be considered more important. For example, a larger weight may be assigned to {planar mode, DC mode, VER mode, HOR mode, HDIA mode, DIA mode, VDIA mode} having a high probability of occurrence. In addition, a larger weight may be assigned to the basic angle mode compared to the extended angle mode. According to another embodiment, the weights $w_1$ and $w_2$ may be variably configured according to the shape of the current block to further increase the priority of a specific angle mode. For example, when the current block is a vertical block, a larger weight may be configured for VER mode and angle modes near the VER mode, and when the current block is a horizontal block, a larger weight may be configured in the HOR mode and angle modes near the HOR mode. According to another embodiment, the weights w1 and w2 may be variably configured according to positions of corresponding neighbor blocks. For example, when the priority between neighbor blocks is configured in the order of {block L, block A, block BL, block AR, block AL}, high weight may be assigned according to this order. For example, when the prediction mode of the block L(2) and the block AL(2) is 34, a larger weight is multiplied to the block L(2) to be added to the occurrence frequency.

When the weights w1 and w2 are variably configured, the frequency increases by w1 and w2, respectively, when a specific prediction mode in each list occurs. According to an embodiment, the weights w1 and w2 may be pre-configured. In this case, since both the encoder and the decoder use the same weights w1 and w2, both the encoder and the decoder can perform the same occurrence frequency calculation without additional signaling. According to another embodiment, information on the weights w1 and w2 may be signaled through RBSP such as PPS, VPS or SPS.

The MPM list of the current block may be configured based on the final occurrence frequency calculated according to the above-described embodiment. The intra prediction mode with high occurrence frequency in neighbor blocks has a high probability of being selected in the current block. Accordingly, intra prediction modes having a high final occurrence frequency calculated from neighbor blocks may be included in the MPM list of the current block. For example, when the size of the MPM list is m, the MPM list may be configured with planar mode, DC mode, and upper-level m−2 angle modes with high final occurrence frequency. In addition, as the index in the MPM list is lower, expression is possible with the fewer bits, so that a prediction mode having a high final occurrence frequency may be matched to a smaller MPM index in the MPM list.

On the other hand, when there are a plurality of angle modes having the same value of the final occurrence frequency other than 0, the occurrence frequency of the corresponding angle modes in the first step neighbor blocks may be considered first. For example, when the final occurrence frequency of the intra prediction mode 18 and the intra prediction mode 50 is the same, a higher priority is assigned to the intra prediction mode in which the occurrence frequency in the first step neighbor blocks is higher. According to another embodiment, when there are a plurality of angle modes having the same value of which the final occurrence frequency is not 0, priority among corresponding angle modes may be determined according to the shape of the current block. For example, when the current block is a vertical block, a higher priority may be assigned to the angle mode of block A(1), block AR(1), and block AL(1) among the first step neighbor blocks or close to the vertical mode, or a higher priority may be assigned to the angle mode.

According to an embodiment, the MPM indexes of planar mode and DC mode in the MPM list may be configured differently according to the intra prediction mode of the first step neighbor blocks. For example, among the intra prediction modes of the first step neighbor blocks, when the occurrence frequency of the planar mode and the DC mode is greater than or equal to a threshold value, the planar mode and the DC mode may match the MPM indexes 0 and 1. In addition, when the occurrence frequency of the angle mode among the intra prediction modes of the first step neighbor blocks is greater than or equal to a threshold, the MPM index of the angle mode may be configured with a smaller value than the MPM index of the planar mode and DC mode.

In the above-described embodiment, when the angle modes having a final occurrence frequency other than 0 are less than m−2, the MPM list may be configured using one or more of {VER mode, HOR mode, HDIA mode, VDIA mode}. In addition, in order to minimize the signaling overhead required to encode the non-MPM mode, prediction modes having a high final occurrence frequency may be used. For example, prediction modes having a high final occurrence frequency may be included in the selected mode list or may be matched to a low value index signaled by fewer bits of non-selected modes. According to another embodiment, the selected mode list may be configured using angle modes obtained by adding or subtracting a pre-configured offset to or from angle modes having a high final occurrence frequency included in the MPM list. In addition, an angle mode having a final occurrence frequency other than 0, which is not included in the MPM list, and angle modes obtained by adding or subtracting a preset offset to or from a corresponding mode may be matched to a low value index signaled by fewer bits among non-selected modes.

Hereinafter, the operation of the encoder for encoding the intra prediction mode of the current block based on the occurrence frequency of the intra prediction mode of neighbor blocks is as follows. First, in order to encode the intra prediction mode for the current block, the encoder checks whether the neighbor block of the current block exists and calculates the occurrence frequency of the intra prediction mode of the neighbor block. Next, the encoder configures at least one of the MPM list, the selected mode list, or the non-selected modes based on the occurrence frequency of the intra prediction mode of neighbor blocks. In this case, the prediction mode having a high occurrence frequency may be configured to have a high priority. Next, the encoder encodes an MPM flag indicating whether the intra prediction mode of the current block exists in the MPM list of the current block. When the intra prediction mode of the current block does not exist in the MPM list of the current block, the selected mode flag indicating whether the intra prediction mode matches any one of the selected modes is encoded. On the other hand, when the intra prediction mode of the current block exists in the MPM list of the current block (e.g., when the value of the MPM flag is 1), the encoder encodes the MPM index corresponding to the intra prediction mode of the current block in the MPM list. In addition, when the intra prediction mode of the current block exists in the selected mode list of the current block (i.e., when the value of the MPM flag is 0 and the value of the selected mode flag is 1), the encoder encodes the selected mode index corresponding to the intra prediction mode of the current block in the selected mode list. In other cases, a non-selected mode index corresponding to the intra prediction mode of the current block is encoded.

In addition, the operation of the decoder for decoding the intra prediction mode of the current block based on the occurrence frequency of the intra prediction mode of neighbor blocks is as follows. First, in the process of parsing the symbols of the current block, the MPM flag of the current block is parsed, and when the MPM flag is 0, an additional selected mode flag is parsed. Like the encoding process, the decoder checks whether the neighbor block of the current block exists and calculates the occurrence frequency of the intra prediction mode of the neighbor block. Next, the decoder configures at least one of the MPM list, the selected mode list, or the non-selected modes based on the occurrence frequency of the intra prediction mode of neighbor blocks. The method of configuring the MPM list, the selected mode list and the non-selected modes in the decoder is the same as the method in the encoder described above. When the MPM flag is 1, the decoder decodes the MPM index. When the MPM flag is 0 and the selected mode flag is 1, the decoder decodes the selected mode index. In other cases, the decoder decodes the non-selected mode index to determine the intra prediction mode of the current block.

The decoder may perform intra prediction using the determined intra prediction mode and generate a prediction block.

FIGS. 20 and 21 show an embodiment of classifying intra prediction modes into a plurality of subsets. As the number of intra prediction modes increases, the probability that the intra prediction mode of the current block is included in the MPM list decreases, and this increases the amount of bits required for intra prediction mode encoding. To solve this, the intra prediction mode may be classified into a plurality of subsets, and intra prediction may be performed using a prediction mode set according to the surrounding context of the current block.

First, FIG. 20 illustrates an embodiment of dividing intra prediction modes into a plurality of subsets. According to the embodiment of FIG. 20, N intra prediction modes of the intra prediction mode set may be classified into M subsets ($S_0, S_1, \ldots S_{M-1}$) configured with exclusive intra prediction modes. In FIG. 20, $m_{i,j}$ indicates a j-th intra prediction mode belonging to the i-th subset. Each subset $S_i$ is configured with $K_i$ exclusive intra prediction modes, and satisfies Equation 2 below.

$$N=\Sigma_{i=0}^{M-1}K_i \quad \text{[Equation 2]}$$

In this case, the number $K_i$ of intra prediction modes configuring each intra prediction mode subset may be different for each subset.

For example, when the intra prediction mode set includes a total of 67 intra prediction modes, intra prediction modes may be divided into a horizontal mode set {planar mode, mode 2, mode 3, . . . , mode 34} and a vertical mode set {DC mode, mode 35, mode 36, . . . , mode 66}. According to another embodiment, the intra prediction modes can be divided into a horizontal mode set {horizontal mode, mode 10, mode 11, . . . , mode 26}, a vertical mode set {DC mode, mode 42, mode 43, . . . , mode 58}, a DIA mode set {mode 27, mode 28, . . . , mode 41}, an HDIA mode set {mode 2, mode 3, . . . , mode 9}, and a VDIA mode set {mode 59, mode 60, . . . , mode 66}. In another embodiment, intra prediction modes may be divided into a first subset {planar mode, DC mode, basic angle modes} and a second subset {extended angle modes}.

Next, FIG. 21 shows another embodiment of dividing intra prediction modes into a plurality of subsets. According to the embodiment of FIG. 21, the N intra prediction modes of the intra prediction mode set include M subsets ($S_0, S_1, \ldots S_{M-1}$) including an intra prediction mode overlapping (or shared) with the exclusive intra prediction mode. According to an embodiment, sharing intra prediction modes may be configured with upper-level L intra prediction modes having a high probability of being statistically selected in intra prediction. In FIG. 21, cmk indicates a k-th sharing intra prediction mode belonging to each subset, and $m_{i,j}$ indicates a j-th exclusive intra prediction mode belonging to the i-th subset. Each subset $S_i$ is configured with L sharing intra prediction modes and $L_i$ exclusive intra prediction modes, and satisfies Equation 3 below.

$$N=L+\Sigma_{i=0}^{M-1}L_i \quad \text{[Equation 3]}$$

In this case, the number of exclusive intra prediction modes $L_i$ included in each intra prediction mode subset may be different for each subset.

For example, when the intra prediction mode set includes a total of 67 intra prediction modes, the sharing intra prediction modes may be configured with one or more of {planar mode, DC mode, HDIA mode, HOR mode, DIA mode, VER mode, VDIA mode}. By utilizing this, the intra prediction modes may be divided into a first subset {planar mode, DC mode, basic angle modes} and a second subset {planar mode, DC mode, HDIA mode, HOR mode, DIA mode, VER mode, VDIA mode, extended angle modes}.

According to another embodiment, the intra prediction modes may be divided into a first subset {planar mode, DC mode, HDIA mode, mode 3, mode 4, . . . , mode 33, DIA mode, VER mode, VDIA mode} and a second subset {planar mode, DC mode, HDIA mode, HOR mode, DIA mode, mode 35, mode 36, . . . , mode 65, VDIA mode}.

Figure 22:
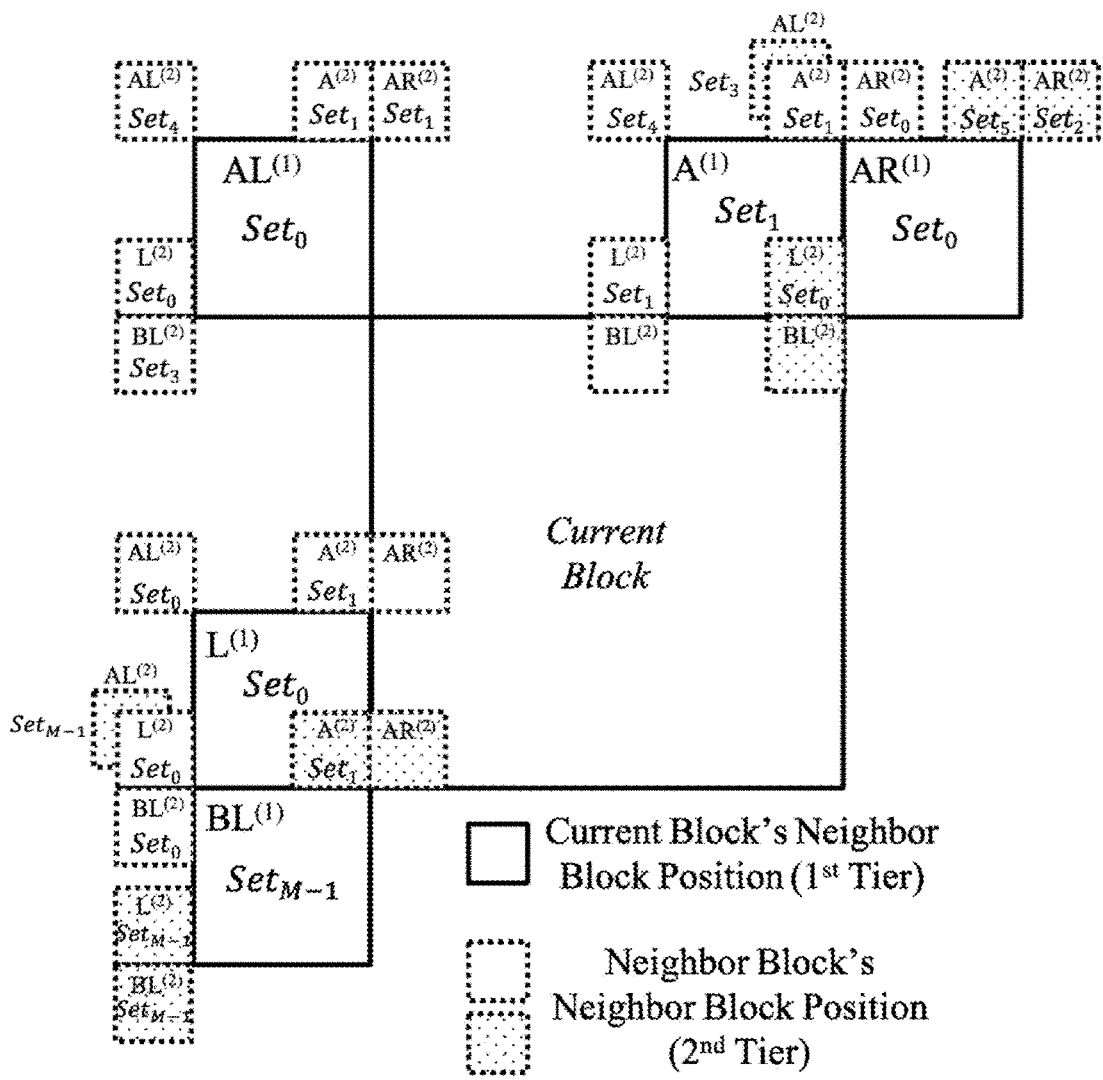
FIG. 22 shows an embodiment of signaling the intra prediction mode of a current block using a subset of classified intra prediction modes.

FIG. 22 shows an embodiment of signaling the intra prediction mode of a current block using a subset of classified intra prediction modes. According to an embodiment of the present invention, the intra prediction mode subset of the current block may be determined using the intra prediction mode subset used in the neighbor block of the current block.

When each intra prediction mode subset is configured with exclusive intra prediction modes according to the embodiment of FIG. 20, the intra prediction mode subset information including the intra prediction mode of neighbor blocks may be checked, and the intra prediction mode subset of the current block may be determined using the information. That is, the intra prediction mode subset most used in neighbor blocks may be allocated as the intra prediction mode subset of the current block. In this case, the embodiments of FIGS. 16 to 18 referring to the extended neighbor blocks may be additionally applied to obtain prediction information of the current block.

Referring to FIG. 22, first, intra prediction mode subset information of first step neighbor blocks L(1), A(1), BL(1), AR(1), and AL(1) of the current block is referred to, and next, the intra prediction mode subset information of the second step neighbor blocks L(2), A(2), BL(2), AR(2), and AL(2) of the current block is referred to so that the intra prediction mode subset of the current block can be determined. According to one embodiment, based on the occurrence frequency calculation method described with reference to FIG. 19, weights w1 and w2 are applied to the frequency of the intra prediction mode subset frequency of the first step neighbor blocks and the frequency of the intra prediction mode subset of the second step neighbor blocks, respectively, so that the final occurrence frequency of the intra prediction mode subset may be calculated. In this case, the intra prediction mode subset having the largest occurrence frequency may be allocated as the intra prediction mode subset of the current block.

On the other hand, when there are a plurality of intra prediction mode subsets having the same value as the final occurrence frequency other than 0, similarly to the embodiment described with reference to FIG. 19, the occurrence frequency in the first step neighbor blocks may be preferentially considered, or one intra prediction mode subset may be selected based on the shape of the current block.

Next, according to the embodiment of FIG. 21, when each intra prediction mode subset includes a sharing intra prediction mode, due to the sharing intra prediction modes, there is a case where the intra prediction mode subset cannot be identified only by the intra prediction mode information of neighbor blocks. That is, when the intra prediction mode of the neighbor block is one of the sharing intra prediction modes, the intra prediction mode subset of the neighbor block cannot be derived. Therefore, the index of the intra prediction mode subset of the current block should be signaled separately, and the intra prediction mode subset information of the current block should be stored.

In the above situation, according to an embodiment, the index of the intra prediction mode subset of the current block may not be signaled separately. As the number of intra prediction mode subsets increases, the number of bits required to express the intra prediction mode subset index information increases so that intra prediction mode subset information of a neighbor block having a sharing intra prediction mode may be determined according to a preset rule. For example, when a sharing intra prediction mode is used for a neighbor block, the basic subset may be determined as a subset of the intra prediction mode of the neighbor block. Alternatively, the intra prediction mode subset may be determined according to the type of sharing intra prediction mode of the corresponding block. For example, when the sharing intra prediction mode used in the neighbor block is the vertical mode, a subset including a lot of angle modes near the vertical mode may be determined as the intra prediction mode subset of the neighbor block. In addition, when the sharing intra prediction mode used in the neighbor block is a horizontal mode, a subset including a lot of prediction modes near the horizontal mode may be determined as a subset of the intra prediction mode of the neighbor block.

When the intra prediction mode subset of the current block is determined, the MPM list and the non-MPM mode of the current block may be configured in consideration of priority within the intra prediction mode subset.

According to an embodiment, the MPM list may be configured based on the neighbor block position of the preset priority and/or the intra prediction mode of the preset priority. The prediction mode of neighbor blocks having the same intra prediction mode subset as the current block may be added to the MPM list in the order of left block, upper block, lower left block, upper right block and upper left block. In addition, when the planar mode and the DC mode are included in the intra prediction mode subset of the current block, the intra prediction modes may be considered in preference to the angle mode. However, in a case where the sharing intra prediction mode is included in the intra prediction mode subset, if the intra prediction mode of a neighbor block having a different intra prediction mode subset from the current block is one of the sharing intra prediction modes, the intra prediction mode of the neighbor block can be added to the MPM list of the current block according to the preset priority. For example, even if the sharing intra prediction mode is {planar mode, DC mode, HDIA mode, HOR mode, DIA mode, VER mode, VDIA mode}, and the intra prediction mode subset of the left block is different from the current block, when the intra prediction mode of the left block is one of the sharing intra prediction modes, the intra prediction mode may be included in the MPM list of the current block.

According to another embodiment, the MPM list may be configured based on the shape of the current block and the shape of the neighbor block. When the current block is a vertical block, high priority is assigned to the intra prediction mode of a block having the same intra prediction mode subset as the current block among the upper block, the upper right block, and the upper left block, and vertical modes in the current intra prediction mode subset or angle modes close to the vertical mode may be preferentially added to the MPM list. According to another embodiment, based on the occurrence frequency calculation method described with reference to FIG. 19, in consideration of the frequency of the prediction mode included in the intra prediction mode subset of the current block among the prediction modes of the first step neighbor blocks of the current block and the prediction modes of the second step neighbor blocks, at least one of the MPM list, the selected mode list, or the non-selected modes may be configured.

As described above, when N prediction modes are divided into M intra prediction mode subsets and intra prediction mode subset information of neighbor blocks is used to determine the intra prediction mode subset of the current block, a list of optimal prediction modes in which unnecessary intra prediction modes are removed from the current block may be configured. Therefore, the probability that the intra prediction mode of the current block matches the intra prediction mode in the MPM list is increased, and the amount of bits required for intra prediction mode signaling can be reduced.

FIG. 23 shows a detailed embodiment of signaling the intra prediction mode of the current block using a subset of the classified intra prediction modes. In the embodiment of FIG. 23, it is assumed that the intra prediction mode subsets are configured with exclusive intra prediction modes. More specifically, 67 intra prediction modes of the intra prediction mode set may be classified into two subsets configured with exclusive intra prediction modes. The two intra prediction mode subsets may be configured with 35 intra prediction modes and 32 intra prediction modes, respectively. For example, the first subset may be configured with {planar mode, DC mode, 33 basic angle modes}, and the second subset may be configured with {32 extended angle modes}. Or, the intra prediction modes may be divided into a horizontal mode set {planar mode, DC mode, mode 2, mode 3, . . . , mode 34} and a vertical mode set {mode 35, mode 36, . . . , mode 66}.

When intra prediction modes are classified into two subsets, the number of signaled MPM modes, selected modes, and non-selected modes can be adjusted. That is, 4 MPM modes, 8 selected modes, and 23 (or 20) non-selected modes may be used to signal intra prediction of the current block. FIG. 23(a) shows an embodiment of signaling each flag and index for intra prediction of a current block, and FIG. 23(b) shows an embodiment of non-selected mode indexes signaled by truncated binary binarization.

When the intra prediction mode of the current block is in the MPM list, the MPM flag and MPM index may be signaled. In this case, the MPM flag is signaled in 1 bit, and the MPM index is coded in truncated binary binarization and signaled in 1 to 3 bits. The binarized MPM index can be encoded through CABAC. Meanwhile, when the intra prediction mode of the current block does not exist in the MPM list, the MPM flag may be set to 0, and the intra prediction mode may be encoded using the selected mode and the non-selected mode. When the intra prediction mode matches one of the eight selected modes, the MPM flag, the selected mode flag, and the selected mode index are signaled. In this case, the MPM flag and the selected mode flag are signaled in 1 bit, and the selected mode index is signaled in fixed 3 bits.

In the case of the remaining non-selected modes, the MPM flag, the selected mode flag, and the non-selected mode index are signaled. In this case, the non-selected mode index may be signaled by being coded with truncated binary binarization. When the first subset including 35 intra prediction modes for the current block is used, the number of non-selected modes in the subset may be 23. Since $2^4 < 23 < 2^5$ is satisfied, the indexes of the upper-level 9 modes of non-selected modes may be signaled in 4 bits, and the indexes of the lower-level 14 modes may be signaled in 5 bits. However, when a second subset including 32 intra prediction modes is used for the current block, the number of non-selected modes in the subset may be 20. Since $2^4<20<2^5$ is satisfied, the indexes of the upper-level 12 modes of non-selected modes may be signaled in 4 bits, and the indexes of the lower-level 8 modes may be signaled in 5 bits.

Figure 24:
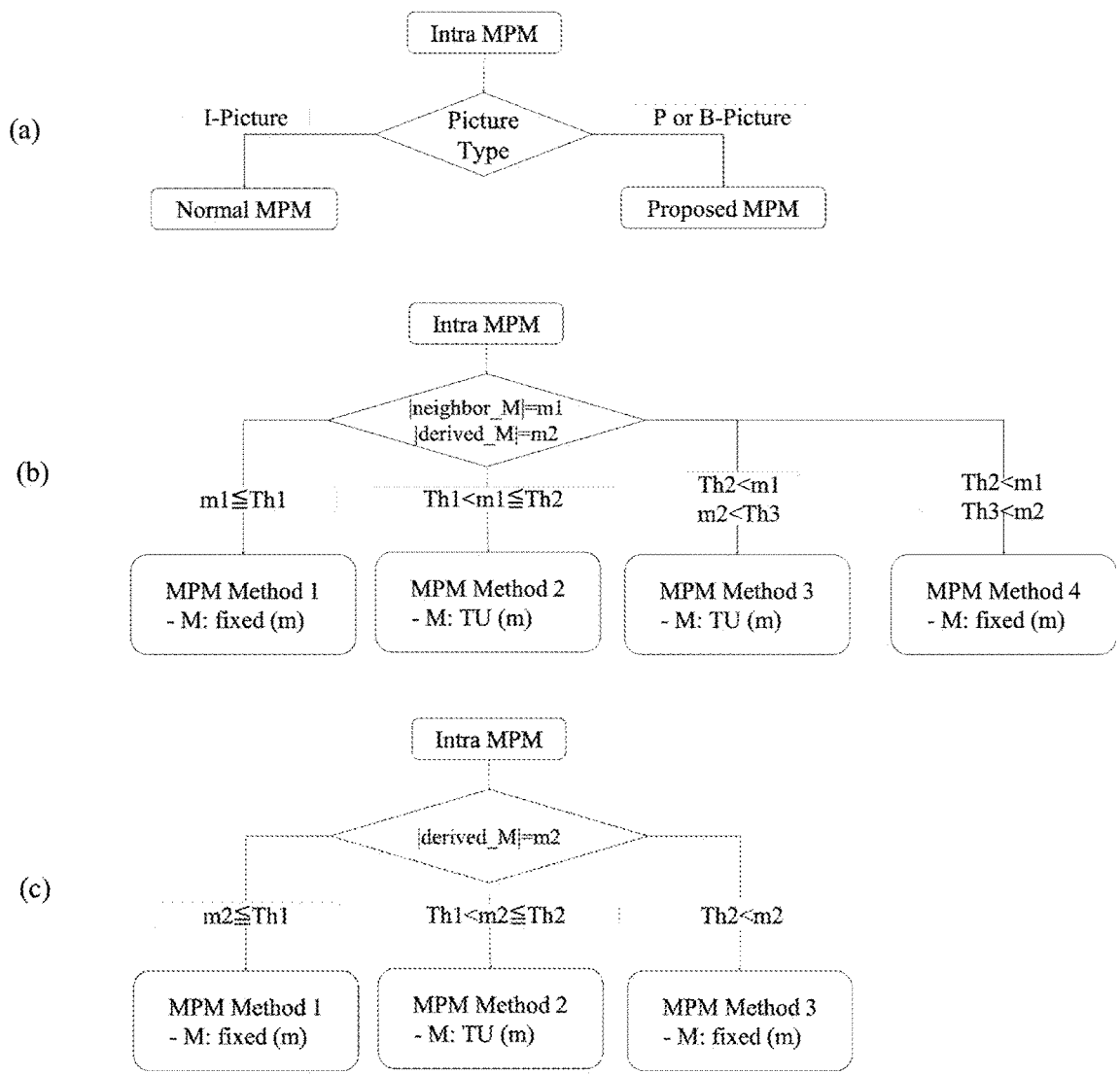
FIG. 24 illustrates an embodiment of dynamically signaling an intra prediction mode of a current block based on prediction information of neighbor blocks.

FIG. 24 illustrates an embodiment of dynamically signaling an intra prediction mode of a current block based on prediction information of neighbor blocks. More specifically, according to the embodiment of FIG. 24, the MPM mode configuration may be changed according to various conditions. FIG. 24(a) shows a method of changing an MPM configuration according to the type of a picture to which a current block belongs. FIGS. 24(b) and 24(c) show a method of variably configuring the MPM mode according to intra prediction modes used in neighbor blocks.

First, FIG. 24(a) illustrates a method of changing an MPM configuration according to a type of a picture to which a current block belongs according to an embodiment of the present invention. Existing configurations such as MPM mode, non-MPM mode, selected mode, and non-selected mode were applied identically regardless of the type of the picture to which the block belongs (i.e., I picture, P picture, or P picture). However, according to an embodiment of the present invention, as shown in FIG. 24(a), an MPM configuration method in the P picture and the B picture in which neighbor blocks can freely perform inter prediction and intra prediction may be applied differently from the MPM configuration method in the I picture in which neighbor blocks perform intra prediction only. For example, the number of MPM modes in the P picture and the B picture may be configured differently from the number of MPM modes in the I picture. That is, the number of MPM modes in the P picture and the B picture may be configured to be smaller than the number of MPM modes in the I picture.

Next, FIG. 24(b) shows an embodiment of the present invention to variably configure the MPM mode according to intra prediction modes used in neighbor blocks. If the current tile (or slice) is a P tile (or slice) or a B tile (or slice), the decoder searches for prediction modes used in the position of neighbor blocks. In this case, the number of positions identified as intra prediction blocks among all search positions (e.g., L, A, BL, AR, and AL) of neighbor blocks is indicated as m1. In addition, the number of different intra prediction modes used for intra prediction in all search positions of neighbor blocks is indicated as m2. For example, if all the search positions of neighbor blocks are identified as an intra prediction block, m1 may have a large value, but if all of the intra prediction modes used in each position are the same, m2 is set to 1. According to an embodiment of the present invention, the following variable MPM mode signaling method may be applied based on the values of m1 and/or m2. In each embodiment, Th1, Th2 and Th3 represent a first threshold, a second threshold and a third threshold, respectively. In this case, Th1<Th2<Th3 may be satisfied.

1) When the value of m1 is less than or equal to Th1, the first MPM mode signaling method may be applied. When the number of intra prediction blocks at the positions of the neighbor block is Th1 or less, there is a possibility that the context of the intra prediction mode used at the position of a neighbor block or a mode derived therefrom (e.g., an preset offset is applied to an angle mode) is irrelevant to the current block. That is, since most of the neighbor blocks are likely to be inter prediction blocks, intra prediction of the current block may have a low correlation with neighbor blocks. In this case, it may be appropriate for the MPM mode to signal m intra prediction modes extracted with multiple contexts with equal overhead. Therefore, fixed length encoding may be applied to the MPM mode.

2) When the value of m1 is greater than Th1 but less than Th2, the second MPM mode signaling method may be applied. When the number of intra prediction blocks in the positions of the neighbor block is greater than Th1, the context of the intra prediction mode or modes derived from the neighbor block needs to be considered differentially. That is, since intra-prediction neighbor blocks exist, signaling of the intra prediction mode of the current block is configured based on neighboring intra prediction blocks, but differential signaling in consideration of their position is required. In this case, it may be appropriate for the MPM mode to signal m intra prediction modes extracted with a context that sequentially considers the intra prediction mode used in neighbor blocks and the modes derived therefrom, as differential overhead. Therefore, the MPM mode may be signaled with truncated unary binarization.

3) When the value of m1 is greater than Th2 but the value of m2 is less than Th3, a third MPM mode signaling method may be applied. Since the number of intra prediction blocks is greater than Th2 at the positions of neighbor blocks, but the diversity of used intra prediction modes is not large, it is necessary to differentially consider the context of intra prediction modes of neighbor blocks or modes derived therefrom. In this case, the signaling method of the MPM mode may be the same as the second method.

4) When the value of m1 is greater than Th2 and the value of m2 is also greater than Th3, a fourth MPM mode signaling method may be applied. Since the number of intra prediction blocks is greater than Th2 at the positions of neighbor blocks and thus, the diversity of used intra prediction modes is large, it is necessary to equally consider the context of the intra prediction mode of neighbor blocks or modes derived therefrom and to signal the values through the MPM mode as much as possible. That is, although there are many neighbor blocks in which intra prediction is performed, since intra prediction modes are mostly used in the blocks, intra prediction of the current block requires non-differential signaling in consideration of all neighbor intra prediction blocks. In this case, it may be appropriate for the MPM mode to signal m intra prediction modes extracted with a context that considers the intra prediction mode used in neighbor blocks and the modes derived therefrom, as equal overhead. Therefore, fixed length encoding may be applied to the MPM mode.

In the above methods, the number m of modes signaled in the MPM mode may be determined based on the derived m1 and m2 values. Also, the number s of the selected modes, the number ns of the non-selected modes, and their encoding methods may be determined based on the determined value of m. According to an embodiment, fixed-length encoding is applied to the selected mode, and it may be appropriate to handle signaling of subsequent s intra prediction modes configured based on the number m of MPM modes.

FIG. 24(c) shows another embodiment of the present invention to variably configure the MPM mode according to intra prediction modes used in neighbor blocks. As described above in the embodiment of FIG. 24(b), the number of different intra prediction modes used for intra prediction in all search positions of neighbor blocks is indicated as m2. According to another embodiment of the present invention, the following variable MPM mode signaling method may be applied based on the value of m2.

5) When the value of m2 is less than or equal to Th1, a fifth MPM mode signaling method may be applied. When the number of intra prediction blocks in the positions of the neighbor block is less than or equal to Th1, m may be configured with a small number by appropriately reflecting the context of the intra prediction mode or modes derived therefrom. When the number of different intra prediction modes of neighbor blocks is small, even if it is extended to fill the number of MPM modes, this is because it is highly likely that the derived mode is different from the prediction mode of the current block. In this case, a small number of m MPM modes extracted with a single or a few contexts may be used, and it is appropriate to signal the MPM modes with equal overhead. Therefore, fixed length encoding may be applied to the MPM mode.

6) When the value of m2 is greater than Th1 but less than Th2, the sixth MPM mode signaling method may be applied. When the number of intra prediction blocks in the positions of the neighbor block is greater than a predetermined number, the context of the intra prediction mode or modes derived from the neighbor block needs to be considered differentially. A specific embodiment of the sixth MPM mode signaling method is the same as the second MPM mode signaling method described above.

7) When the value of m2 is greater than Th2, the seventh MPM mode signaling method may be applied. Since the number of intra prediction blocks is greater than Th2 at the positions of neighbor blocks and thus, the diversity of used intra prediction modes is large, it is necessary to equally consider the context of the intra prediction mode of neighbor blocks or modes derived therefrom and to signal the values through the MPM mode as much as possible. A specific embodiment of the seventh MPM mode signaling method is the same as the fourth MPM mode signaling method described above.

In the above methods, the number m of modes signaled in the MPM mode may be determined based on the derived m1 value. Also, the number s of the selected modes, the number ns of the non-selected modes, and their encoding methods may be determined based on the determined value of m. According to an embodiment, fixed-length encoding is applied to the selected mode, and it may be appropriate to handle signaling of subsequent s intra prediction modes configured based on the number m of MPM modes.

FIG. 25 shows an embodiment of variably adjusting the number of MPM modes and signaling the intra prediction mode of the current block based on this. As described with reference to FIG. 24, a small number of MPM modes may be used according to the MPM mode signaling method.

Referring to FIG. 25(a), the number of MPM modes is not fixed, but may vary based on intra prediction mode information of neighbor blocks. Among the total of 67 intra prediction modes, two modes may be set to MPM modes and signaled with fixed length encoding. The fixed length encoding scheme assigns equal priority among signaling modes. Next, the number s of the selected mode may be determined as 16 or 9, and the selected mode is signaled by fixed length encoding. In this case, since a relatively small number of MPM modes are signaled, according to the embodiment of FIG. 25A, the number (i.e., 16) of selected modes may be increased to increase the probability that intra prediction modes that are not signaled in the MPM mode are signaled in the selected mode. However, when signaling is performed in the selected mode, the signaling overhead is the same as that of the method using the existing fixed number of MPM modes, so that according to the embodiment of FIG. 25(b), the total overhead can be reduced by reducing the number of selected modes (i.e., 9).

However, in an embodiment in which the number of selected modes is reduced, when a non-selected mode is signaled, signaling overhead may be increased. In the embodiment of FIG. 25(b) where the number of selected modes is 9, 56 non-selected modes, whose number is more than that in the embodiment of FIG. 25(a) having 16 selected modes, should be signaled with truncated binary binarization. In this case, since $2^5 < 56 < 2^6$, the initial $2^6 - 56 = 8$ indexes of non-selected modes may be signaled using only 5 bits, and the remaining 48 indices can be signaled using 6 bits. Thus, compared to the non-selected mode of FIG. 25(a) signaling 15 indices using 5 bits and signaling 34 indices using 6 bits, it can be seen that the signaling overhead of the non-selected mode in FIG. 25(b) is increased.

In the above embodiments, the number m of intra prediction modes signaled in the MPM mode may be determined based on the method described above with reference to FIG. 24. Also, the number s of selected modes may be determined based on the determined value of m. Also, the number s of the selected modes may be determined based on the following additional conditions.

First, the number of selected modes may be determined based on the value and context of the intra prediction mode determined as the MPM mode. If the intra prediction mode of neighbor blocks is reflected when determining the MPM mode, it is highly likely that the intra prediction mode of the current block is signaled through the MPM mode or a selected mode derived therefrom. Accordingly, additional intra prediction modes derived from the MPM mode may be obtained, and the additional intra prediction modes may be configured and signaled by configuring a relatively small number of selected modes. As such, the signaling overhead can be reduced by limiting the number of selected modes. However, when determining the MPM mode, in the case where the intra prediction mode of neighbor blocks is not reflected and the MPM list is configured with basic angle modes such as planar mode, DC mode, VER mode, and HOR mode, a relatively large number of selected modes can be configured and signaled. Since the MPM list is configured in a context independent of neighbor blocks, it is possible to increase the number of selected modes as much as possible to increase the possibility that the intra prediction mode of the current block is included in the selected mode. Meanwhile, the number ns of the non-selected modes is determined by subtracting the number m of the MPM mode and the number s of the selected mode from the total number T of the intra prediction modes.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A method for processing a video signal comprising:
receiving intra prediction mode information for a current block, wherein the intra prediction mode information indicates one of a plurality of intra prediction modes included in an intra prediction mode set, wherein the intra prediction mode set comprises a plurality of angle modes, and the plurality of angle modes comprises a basic angle mode and an extended angle mode, wherein the basic angle mode is a mode corresponding to an angle within a preset first angle range;
determining the extended angle mode based on a sum of an index of a basic angle mode corresponding to the extended angle mode and a predetermined offset, wherein the sum of the index of the basic angle mode corresponding to the extended angle mode and the predetermined offset represents the extended angle mode; and
decoding the current block based on the determined the extended angle mode.

2. The method of claim 1, wherein the extended angle mode is an angle mode between basic angle modes within the first angle range.

3. The method of claim 1, wherein an interval between the extended angle modes of the intra prediction mode set is set based on an interval between corresponding basic angle modes.

4. The method of claim 3, wherein an angle interval between the extended angle modes is set to be the same as an angle interval between the corresponding basic angle modes.

5. The method of claim 1, wherein whether to use the extended angle mode is determined based on at least one of a shape and size of the current block.

6. The method of claim 1, wherein the number of extended angle modes in the intra prediction mode set is set below the number of basic angle modes.

7. A video signal processing apparatus comprising a processor, wherein processor is configured to:
receive intra prediction mode information for a current block, wherein the intra prediction mode information indicates one of a plurality of intra prediction modes configuring an intra prediction mode set, wherein the intra prediction mode set comprises a plurality of angle modes, and the plurality of angle modes comprises a basic angle mode and an extended angle mode, wherein the basic angle mode is a mode corresponding to an angle within a preset first angle range;
determine the extended angle mode based on a sum of an index of a basic angle mode corresponding to the extended angle mode and a predetermined offset, wherein the sum of the index of the basic angle mode corresponding to the extended angle mode and the predetermined offset represents the extended angle mode, and decode the current block based on the determined the extended angle mode.

8. The video signal processing apparatus of claim 7, wherein the extended angle mode is an angle mode between basic angle modes within the first angle range.

9. The video signal processing apparatus of claim 7, wherein an interval between the extended angle modes of the intra prediction mode set is set based on an interval between corresponding basic angle modes.

10. The video signal processing apparatus of claim 9, wherein an angle interval between the extended angle modes is set to be the same as an angle interval between the corresponding basic angle modes.

11. The video signal processing apparatus of claim 7, wherein whether to use the extended angle mode is determined based on at least one of a shape and size of the current block.

12. The video signal processing apparatus of claim 7, wherein the number of extended angle modes in the intra prediction mode set is set below the number of basic angle modes.

13. A video signal encoding apparatus comprising a processor,
wherein processor is configured to:
determine intra prediction mode information for a current block, wherein the intra prediction mode information indicates one of a plurality of intra prediction modes configuring an intra prediction mode set, wherein the intra prediction mode set comprises a plurality of angle modes, and the plurality of angle modes comprises a basic angle mode and an extended angle mode, wherein a sum of an index of the basic angle mode corresponding to the extended angle mode and a predetermined offset represents the extended angle mode, and
generate a bitstream including the intra prediction mode information.

14. A non-transitory computer-readable medium storing a bitstream, the bitstream being decoded by a decoding method,
wherein the decoding method, comprising:
receiving intra prediction mode information for a current block, wherein the intra prediction mode information indicates one of a plurality of intra prediction modes configuring an intra prediction mode set, wherein the intra prediction mode set comprises a plurality of angle modes, and the plurality of angle modes comprises a basic angle mode and an extended angle mode, wherein the basic angle mode is a mode corresponding to an angle within a preset first angle range;
determining the extended angle mode based on a sum of an index of a basic angle mode corresponding to the extended angle mode and a predetermined offset, wherein the sum of the index of the basic angle mode corresponding to the extended angle mode and the predetermined offset represents the extended angle mode, and
decoding the current block based on the determined the extended angle mode.

* * * * *